(12) United States Patent
Takahashi

(10) Patent No.: US 7,914,380 B2
(45) Date of Patent: Mar. 29, 2011

(54) GAME DEVICE AND GAME SYSTEM

(75) Inventor: Kazuya Takahashi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 673 days.

(21) Appl. No.: 11/659,446

(22) PCT Filed: Jun. 30, 2005

(86) PCT No.: PCT/JP2005/012053
§ 371 (c)(1),
(2), (4) Date: Feb. 5, 2007

(87) PCT Pub. No.: WO2006/013686
PCT Pub. Date: Feb. 9, 2006

(65) Prior Publication Data
US 2008/0032759 A1 Feb. 7, 2008

(30) Foreign Application Priority Data
Aug. 4, 2004 (JP) ................ 2004-227903

(51) Int. Cl.
*A63F 13/00* (2006.01)
(52) U.S. Cl. ........... 463/40; 463/29; 463/42; 463/43
(58) Field of Classification Search ........... 463/29, 463/40, 42, 43
See application file for complete search history.

(56) References Cited

U.S. PATENT DOCUMENTS

| | | | |
|---|---|---|---|
| 5,359,510 A * | 10/1994 | Sabaliauskas | 700/91 |
| 6,203,433 B1 | 3/2001 | Kume | |
| 6,755,743 B1 | 6/2004 | Yamashita et al. | |
| 6,835,137 B1 | 12/2004 | Nakamura | |
| 2001/0004609 A1* | 6/2001 | Walker et al. | 463/42 |
| 2003/0070178 A1* | 4/2003 | Boyd et al. | 725/110 |
| 2003/0186744 A1* | 10/2003 | Bradell | 463/42 |

(Continued)

FOREIGN PATENT DOCUMENTS

JP 2001-224865 A 8/2001

(Continued)

OTHER PUBLICATIONS

Supplementary European Search Report dated Aug. 14, 2008.

(Continued)

*Primary Examiner* — James S McClellan
(74) *Attorney, Agent, or Firm* — Sughrue Mion, PLLC

(57) ABSTRACT

A multi-player game system (100) includes a lobby server (3) and a plurality of game devices (A1, A2, . . . and B1, B2, . . . ). When there is a preceding entry game device in a competition waiting state, since the server device has already received an entry request from the preceding entry game device, the lobby server (3) indicates the preceding entry game device as an opponent to a new entry game upon receiving an entry list request from the new entry game device. This indication is issued irrespective of the round of the knockout competition in which each of the new entry game device and the preceding entry game device is. The game device manages the round of the knockout competition in which the game device is, progresses the game device to the next round on the basis of determination as to whether or not the game device has won, and causes a display of the game device to show an image corresponding to the round.

14 Claims, 14 Drawing Sheets

U.S. PATENT DOCUMENTS

| | | | |
|---|---|---|---|
| 2003/0190960 A1* | 10/2003 | Jokipii et al. | 463/42 |
| 2005/0215300 A1* | 9/2005 | Oliveras | 463/13 |
| 2005/0278041 A1* | 12/2005 | Bortnik et al. | 700/91 |
| 2007/0155488 A1* | 7/2007 | Kubota et al. | 463/29 |

FOREIGN PATENT DOCUMENTS

| | | |
|---|---|---|
| JP | 2003-000953 A | 1/2003 |
| JP | 2004-154365 A | 6/2004 |
| JP | 2004-171523 A | 6/2004 |
| JP | 2000-51518 A | 12/2004 |
| WO | 95/30465 A1 | 11/1995 |

OTHER PUBLICATIONS

Chinese Office Action dated Jul. 24, 2009.
European Office Action dated Aug. 14, 2009.

* cited by examiner

GAME DEVICE AND GAME SYSTEM

TECHNICAL FIELD

The present invention relates to a game device and to a game system.

BACKGROUND ART

A network-type game system is known in which plural game devices connected via a network are operated under the control of a server (e.g., JP-A-2001-224865). Such a network-type game system allows a player to compete against a remote unknown player, so as to heighten tension and to increase the interest factor in comparison with a computerized match in which a human player competes against a CPU (central processing unit).

Another game system is known in which a plurality of game devices play knockout tournament using a network (e.g., JP-A-2004-171523).

DISCLOSURE OF THE INVENTION

However, in the conventional game system, a knockout tournament cannot start until a predetermined number of participants are available for the first round. Accordingly, there has been a problem in that the greater the number of rounds, the longer the waiting time of the entry applicants.

Accordingly, the present invention provides a game device and a game system that can shorten the waiting time for starting a knockout competition in which a plurality of game devices participate.

In the following, a description will be given of the present invention. It is to be noted that reference numerals in the attached drawings are shown in parenthesis to facilitate understanding of the present invention, and not to limit the present invention to embodiments as shown in the drawings.

A game device (100) according to the present invention includes a server device (3) and a plurality of game devices (A1, A2, ... and B1, B2, ... ), and it is capable of executing a knockout competition including a plurality of rounds. The server device (3) includes a matchmaker (300) for returning a competition wait-instruction to a new entry game device (A1) upon receiving from the new entry game device (A1) an entry request requesting a matchup when there is no preceding entry game device (B1) in a competition waiting state, and for returning an opponent indication to a new entry game device (A1) upon receiving from the new entry game device (A1) an entry request when there is a preceding entry game device (B1) in a competition waiting state since the server device has already received another entry request from the preceding entry game device, the opponent indication indicating an opponent of the new entry game device irrespective of the round of the knockout competition in which each of the new entry game device and the preceding entry game device is. Each of the game devices (A1) includes: a display (21) for displaying images; an establisher (200) for establishing as an opponent another game device (B1) indicated in the opponent indication and for sending a matchup request to the other game device (B1) if information returned from the server device (3) is the opponent indication, the establisher waiting for a matchup request from another game device (B1) and establishing as an opponent another game device (B1) having sent a matchup request upon receiving the matchup request if information returned from the server device (3) is the competition wait-instruction; a result generator (200, S320) for generating first game result information indicating a game result at the game device, and for sending the first game result information to the opponent (B1); a win-or-loss determiner (200, S310, S347) for determining, upon receiving a second game result information indicating the opponent (B1) from the opponent (B1), whether the game device or the opponent has won on the basis of comparing the first game result information with the second game result information; a game progress manager (200, S333) for managing the round of the knockout competition in which the game device is, for progressing the game device to the next round on the basis of the determination by the win-or-loss determiner (200, S310, S347), and for causing the display (21) to show an image corresponding to the round; and an entry requester (200) for sending an entry request to the server device (3) when participating in each round of the knockout competition.

In accordance with the present invention, the opponent of the new entry game device is indicated irrespective of the round of the knockout competition in which each of the new entry game device and the preceding entry game device is. Accordingly, a knockout tournament can be started without waiting for many participants for a round, and the waiting time for entry applicants can be shortened remarkably. Additionally, since each game device independently determines whether the game device or the opponent has won, the workload of the server is reduced. Furthermore, since each game device displays the image corresponding to the round of the knockout competition that the game device is in, players are not informed of the round that the opponent is in.

In the above-described game system, it is preferable that the matchmaker (300) of the server device (3) include a storage device (302) for storing entry information (EL) indicating whether or not a preceding entry game device (A1) is in the competition waiting state; a replier (300, S104, S105) for returning to a new entry game device the opponent indication that is entry information (EL) in which is recorded an identifier of a preceding entry game device (A1) in the competition waiting state, and for returning to a new entry game device the competition wait-instruction that is entry information (EL) in which an identifier of a preceding entry game device (A1) in the competition waiting state is not recorded; a recorder (300, S107) for recording, upon receiving an identifier for identifying one of the game devices (A1) from the game device, the identifier in the entry information (EL); and a deleter (300, S110) for deleting, upon receiving a deletion request from a game device (A1) of which an opponent has been established, the identifier of the game device that sent the deletion request from the entry information (EL). It is also preferable that the establisher (200) of each of the game devices (A1) include a first establisher (200, S340) for referring to an identifier of another game device contained in entry information (EL) returned from the server device (3) if the identifier is recorded in the entry information, for sending a matchup request to the other game device (B1) identified by the identifier, and for establishing as an opponent the other game device identified by the identifier; a second establisher (200, S304) for waiting for a matchup request from another game device (B1) if no identifier is recorded in the entry information (EL) returned from the server device (3), and for establishing as an opponent another game device that sent a matchup request, upon receiving the matchup request; and a deletion requester (200, S305) for sending a deletion request to the server device (3) when the first establisher (200, S340) establishes the opponent.

By virtue of this embodiment, while the server device manages entry information, a game device referring to the entry information may enter into the competition waiting state after recording the identifier of the game device in the server device, or may send a matchup request to another game device which is in the competition waiting state for starting a matchup. The server device simply records an identifier in the entry information, but does not manage the round of the knockout competition in which each game device is. Accordingly, the workload of the server device is reduced, and match-making can be carried out irrespective of the round of knockout competition in which each of the game devices is. "Match-making" is defined as determining opponents of game entry applicants. The "identifier" may be any kind of information that uniquely identifies a game device, and for example may be a communication address of a game device.

A game device (A1) according to the present invention is used in a game system capable of executing a virtual knockout competition including a plurality of rounds, the game system including a server device (3) for returning a competition wait-instruction to a new entry game device upon receiving from the new entry game device an entry request requesting a matchup when there is no preceding entry game device (B1) in a competition waiting state, and for returning an opponent indication to a new entry game device upon receiving from the new entry game device an entry request when there is a preceding entry game device (B1) in a competition waiting state since the server device (3) has already received another entry request from the preceding entry game device (B1), the opponent indication indicating an opponent of the new entry game device irrespective of the round of the knockout competition in which each of the new entry game device and the preceding entry game device is. The game device (A1) includes: a display (21) for displaying images; an establisher (200) for establishing as an opponent another game device (B1) indicated in the opponent indication and for sending a matchup request to the other game device (B1) if information returned from the server device (3) is the opponent indication, the establisher waiting for a matchup request from another game device (B1) and establishing as an opponent another game device (B1) having sent a matchup request upon receiving the matchup request if information returned from the server device (3) is the competition wait-instruction; a result generator (200, S320) for generating first game result information indicating a game result at the game device, and for sending the first game result information to the opponent (B1); a win-or-loss determiner (200, S310, S347) for determining, upon receiving a second game result information indicating the opponent (B1) from the opponent (B1), whether the game device or the opponent has won on the basis of comparing the first game result information with the second game result information; a game progress manager (200, S333) for managing the round of the knockout competition in which the game device is, for progressing the game device to the next round on the basis of the determination by the win-or-loss determiner (200, S310, S347), and for causing the display (21) to show an image corresponding to the round; and an entry requester (200) for sending an entry request to the server device (3) when participating in each round of the knockout competition.

In accordance with the present invention, knockout tournament can start without waiting for many participants for a round, and the waiting time for entry applicants can be shortened remarkably. Furthermore, each game device displays an image corresponding to the round of knockout competition in which the game device is. That is, if a game device for which the number of wins of the rounds is zero (for which the coming round is the first round) compete against another game device for which the number of wins of rounds is one (for which the coming round is the second round), the former game device displays an image suitable for the first round and the latter displays another image suitable for the second round. Therefore, players are not informed of the round in which the opponent is.

Preferably, the server device (3) manages entry information indicating whether or not a preceding entry game device (B1) is in the competition waiting state, the opponent indication is entry information (EL) in which is recorded an identifier of a preceding entry game device (B1) is in the competition waiting state, and the competition wait-instruction is entry information in which an identifier of a preceding entry game device (B1) is in the competition waiting state is not recorded. The establisher may include a first establisher (200, S340) for referring to an identifier of another game device (B1) contained in entry information (EL) returned from the server device (3) if the identifier is recorded in the entry information (EL), for sending a matchup request to the other game device (B1) identified by the identifier, and for establishing as an opponent the other game device (B1) identified by the identifier; a second establisher (200, S304) for waiting for a matchup request from another game device (B1) if no identifier is recorded in the entry information (EL) returned from the server device (3), and for establishing as an opponent another game device (B1) that sent a matchup request, upon receiving the matchup request; and a deletion requester (200, S305) for sending a deletion request to the server device (3) when the first establisher (200, S340) establishes the opponent.

By virtue of this embodiment, the game device referring to the entry information may enter into the competition waiting state after recording the identifier of the game device in the server device, or may send a matchup request to another game device which is in the competition waiting state for starting matchup.

It is preferable that the establisher (200) include a storage device for storing an identifier of another game device (B1) against which the game device competed in a round of the knockout competition. It is also preferable that the first establisher (200, S340) include an identifier transmitter for transmitting a matchup request to another game device (B1), the matchup request containing an identifier of the game device (A1) itself; and a matchup response receiver for receiving a matchup response indicating acceptance of matchup from the other game device (B1) that is a destination of the matchup request, and for establishing the other game device that sent the matchup response as an opponent upon receiving the matchup response. It is also preferable that the second establisher (200, S304) include an identifier comparer for comparing an identifier contained in a matchup request received from another game device (B1) with the identifier stored in the storage device; and a matchup response transmitter for transmitting a matchup response indicating acceptance of matchup to the other game device (B1) that sent the matchup request if the comparison by the identifier comparer is negative.

In this embodiment, the game device records the identifier of another game device against which the game device competed, and may refuse a competition by referring to the record. Therefore, it is possible to avoid playing against the same opponent again, and no player will notice that opponents are determined irrespective of the round of knockout competition in which each of the game devices is.

It is preferable that the second establisher (200, S304) transmit a matchup response indicating refusal of matchup to the other game device (B1) that sent the matchup request if the comparison by the identifier comparer is affirmative, and that the entry requester (200) send an entry request to the server device (3) again upon receiving a matchup response indicating refusal of matchup from another game device (B1). In this embodiment, since the entry requester sends an entry request to the server device again when the matchup request has been refused, the game device may compete against another opponent.

Preferably, the establisher (200) includes a storage device for storing an identifier of another game device (B1) against which the game device competed in a round of the knockout competition. Preferably, the first establisher (200, S340) includes an identifier comparer for comparing, if an identifier is recorded in entry information (EL) returned from the server device, the identifier in the entry information (EL) with the identifier stored in the storage device; a matchup request transmitter for generating a matchup request containing the identifier of the game device (A1) itself if the comparison by the identifier comparer is negative, and for transmitting the matchup request to the other game device (B1) identified by the identifier recorded in the entry information; and a matchup response receiver for receiving a matchup response indicating acceptance of matchup from the other game device (B1) that is a destination of the matchup request, and for establishing the other game device (B1) that sent the matchup response as an opponent upon receiving the matchup response. Preferably, the second establisher (200, S304) includes a matchup response transmitter for transmitting, upon receiving a matchup request from another game device (B1), a matchup response indicating acceptance of matchup to the other game device (B1) that sent the matchup request, and for establishing the other game device that sent the matchup request as an opponent.

In this embodiment, the game device that has received entry information in which an identifier is recorded determines whether or not the opponent designated by the server device is a previous opponent, and sends a matchup request only if the opponent is not a previous opponent. Accordingly, communication resources necessary for communications among game devices can be minimized.

If the identifier comparer of the first establisher (200, S340) determines that the identifier in entry information (EL) coincides with the identifier stored in the storage device, the entry requester may preferably send the entry request to the server device (3) again. In this embodiment, the game device that has received entry information in which an identifier is recorded sends the entry request to the server device again if the opponent indicated by the identifier in the entry information is a previous opponent. Therefore, the game device may compete against another opponent.

In the above-described game device, preferably, the game progress manager (200, S333) includes a counter for counting the number of determinations that the win-or-loss determiner (200, S310, S347) has determined that the game device has won, and a detector for detecting the number counted by the counter has reached a predetermined value prior to the opponent (B1), and the game progress manager determines that the game device has won a current round of the knockout competition if the detector detects that the number counted by the counter has reached the predetermined value prior to the opponent. In this embodiment, since the game progress manager determines whether or not the game device has won the current round on the basis of the number of wins, the skills of players are correctly reflected for the winner of each round.

The game device preferably further includes: a setter, at the start of a game, for setting a life value that is an indicator showing whether or not a game can be continued; a life value manager for decreasing the life value by a predetermined value if the win-or-loss determiner (200, S310, S347) determines that the game device has lost; and a lottery executor for executing a lottery if the life value has fallen to a predetermined value; a terminator for terminating the game if the game device has lost the lottery and for increasing the life value by a predetermined value if the game device has won the lottery.

In this embodiment, it is managed whether or not a game can be continued on the basis of the life value. If the life value falls to a predetermined value (e.g., zero), the game is terminated as a general rule. However, if the game device has won the lottery, the life value is increased so that the game can be continued. Therefore, this routine can raise the player's hopes that the player may continue the game even though the life value is decreased by the loss. The probability of winning the lottery may be varied depending on the scores of players, e.g., the lower the score, the higher the probability of winning, so that unskillful players receive more aid.

EFFECTS OF INVENTION

By virtue of the present invention, game devices, each of which is associated with one of a plurality of players, can compete with each other. Since the winner is determined on the basis of game result information indicating game results of the plurality of players, the interest factor is increased in comparison with a person-to-person match.

BEST MODE FOR CARRYING OUT THE INVENTION

Figure 1:
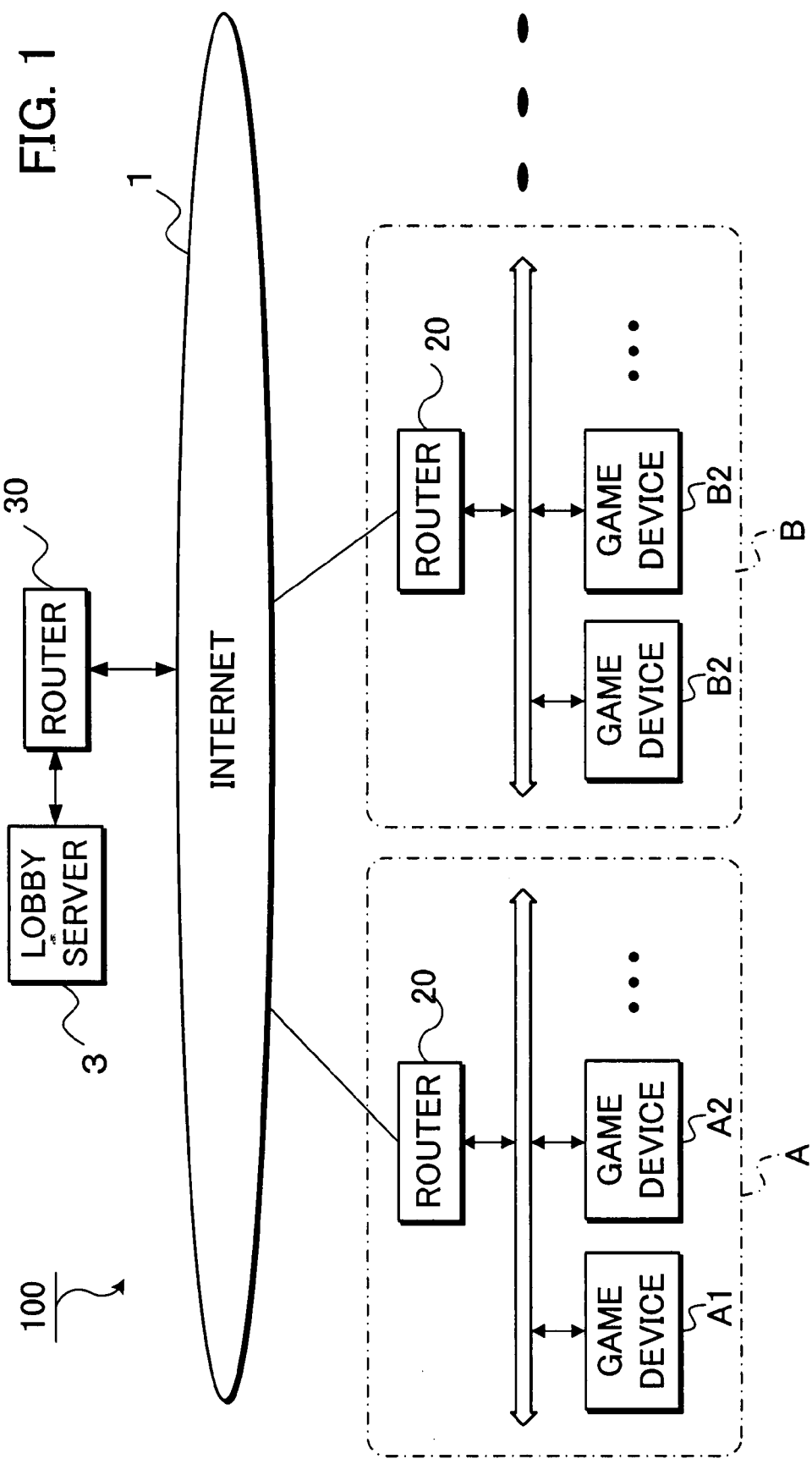
FIG. 1 is a block diagram showing a structure of the game system according to an embodiment of the present invention.

FIG. 1 shows a structure of the game system 100 according to an embodiment of the present invention. In the game system 100, a lobby server 3 is connected with a communication network, e.g., the Internet 1, via a router 30. A plurality of routers 20, 20, . . . located in a plurality of game arcades A, B, . . . , respectively, are connected with the Internet 1. A plurality of game devices A1, A2, . . . and B1, B2, . . . are located in the game arcades A, B, . . . . Each game device can communicate with the lobby server 3 and other game devices via the router 20.

Figure 2:
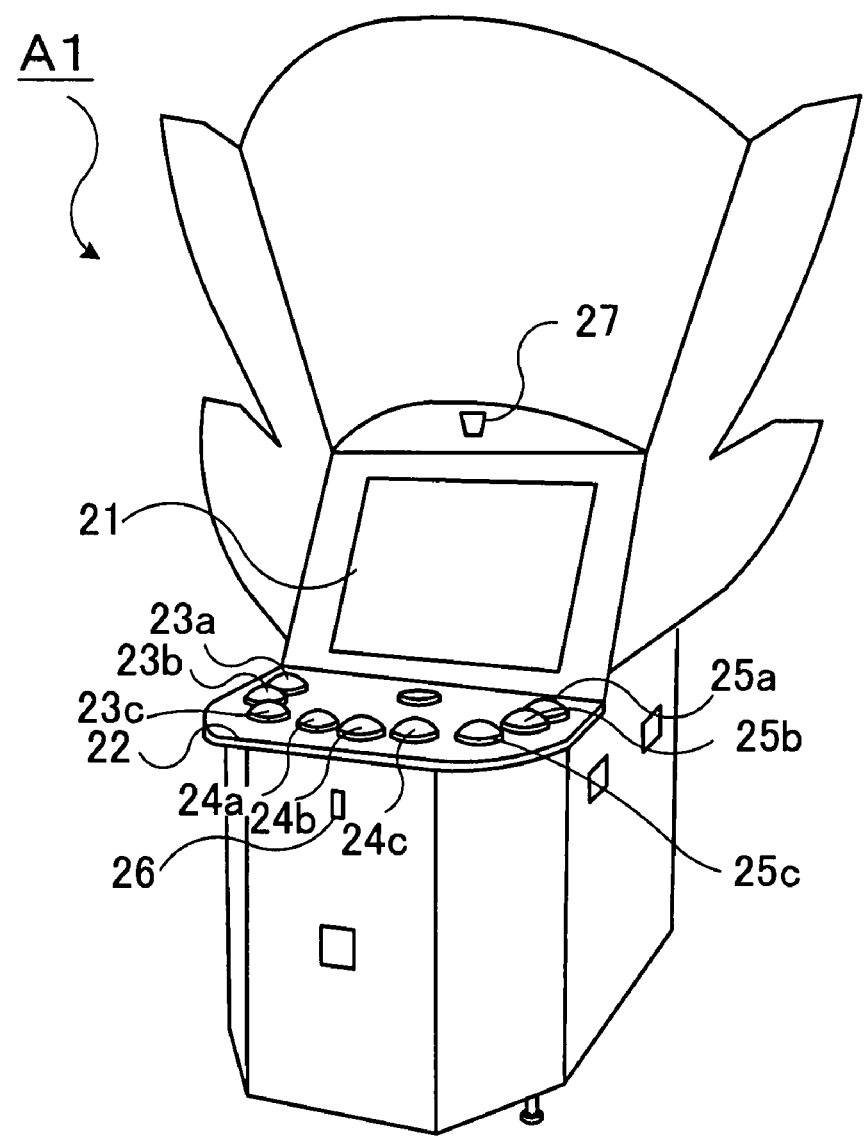
FIG. 2 is a perspective view showing a game device within the game system in FIG. 1.

FIG. 2 shows the appearance of the game device A1. Each of the other game devices has the same structure. The front central portion of the game device A1 includes a display 21 for displaying a game picture. A horizontal console stage 22 is situated below the display 21. Three sets of manual operation buttons are provided on the console stage 22 in such a manner that each set has three manual operation buttons. Using this game device A1, a team formed of at most three players can compete against another team in such a manner that the three players play the same game simultaneously. The first player may manipulate the manual operation buttons 23*a*, 23*b*, and 23*c*. The second player may manipulate the manual operation buttons 24*a*, 24*b*, and 24*c*. The third player may manipulate the manual operation buttons 25*a*, 25*b*, and 25*c*.

A coin slot 26 is provided below the console stage 22. Once a coin is inserted through the coin slot 26, a credit value is increased or the game device A1 is instructed to continue a game before the termination of the game. An electronic camera 27 is provided above the display 21. The electronic camera 27 is used for inputting images for identifying players to the CPU of the game device A1.

Figure 3:
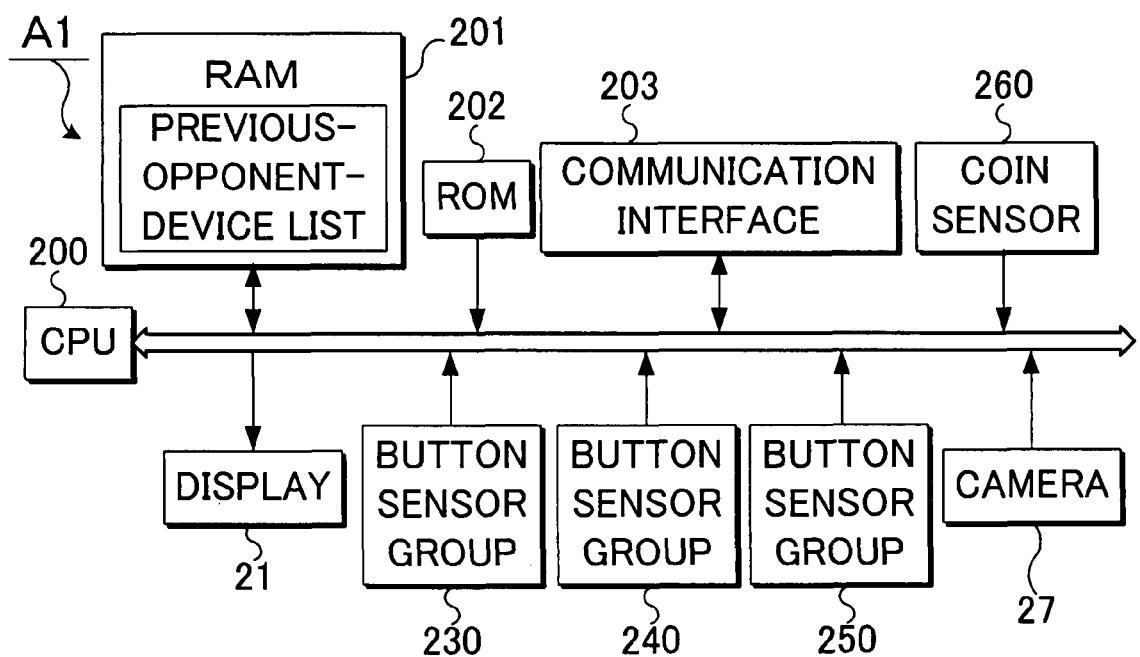
FIG. 3 is a block diagram showing a structure of the game device in FIG. 2.

FIG. 3 shows the electric structure of the game device A1. Each of the other game devices has the same structure. A CPU 200 is connected with other structural elements via a bus and functions as a main controller. A RAM (random access memory) 201 used as a work area of the CPU 200 stores a previous-opponent-device list. In the previous-opponent-device list, one or more identifiers for identifying one or more opponent teams against which the game device has already competed during a knockout competition. More specifically, as the identifier, a communication address of the game device used by such an opponent team is recorded in the previous-opponent-device list. Once a current team finishes a knockout competition using the game device A1, the previous-opponent-device list is cleared. A ROM (read only memory) 202 stores a game program and the like. The CPU 200 controls the whole game device A1 in compliance with the game program. The game device may include another type of storage device, such as a hard disk, DVD, or the like for storing the game program and image data.

A communication interface 203 communicates with the router 20 (see FIG. 1) in compliance with a predetermined protocol under control of the CPU 200. The display 21 is a CRT (cathode ray tube), liquid crystal display, or plasma display, or another suitable image display. A button sensor group 230 consists of three button sensors, which correspond to the manual operation buttons 23*a* through 23*c*, respectively. Each of these button sensors outputs a manipulation signal according to manipulation of the corresponding manual operation buttons (one of 23*a* through 23*c*) by a player. Similarly, a button sensor group 240 corresponds to the manual operation buttons 24*a* through 24*c*, and a button sensor group 250 corresponds to the manual operation buttons 25*a* through 25*c*. The electronic camera 27, which is, e.g., a USB camera, takes image data and inputs the data into the CPU 200 under the control of the CPU 200. A coin sensor 260 informs the CPU 200 that a coin has been inserted through the coin slot 26.

Figure 4:
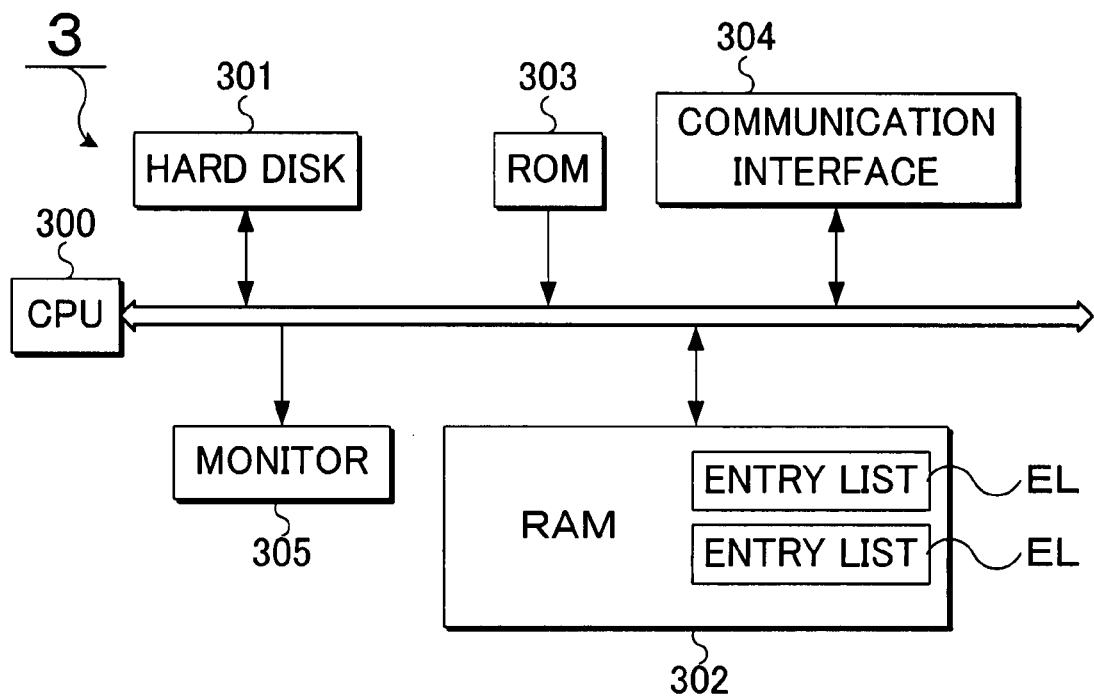
FIG. 4 is a block diagram showing a structure of a lobby server within the game system in FIG. 1.

FIG. 4 shows an electric structure of the lobby server 3. The lobby server 3 assigns a game entry applicant team (game entry applicant team) to its opponent game device in order that the game devices compete against each other. The lobby server 3 includes a CPU 300, a hard disk 301, a ROM 303, a communication interface 304, and a monitor 305. The hard disk 301 stores a control program for executing various processes which include match-making in each round. The CPU 300 extracts the control program into the RAM 302, and then executes the match-making process. The RAM 302 used as a work area of the CPU 300 stores a plurality of entry lists EL. A communication address indicating a game device that is waiting for its opponent can be registered in each entry list EL. Communication addresses of game devices are used as information for identifying game devices or as information for specifying opponents. However, if there is no game entry applicant team, nothing is registered in each entry list EL.

The ROM 303 stores a boot program, which is read out when the lobby server 3 is booted up. The communication interface 304 communicates with the plurality of game devices settled in the game arcades A, B, . . . via the router 30 (see FIG. 1). The CPU 300 makes the monitor 305 display operational states.

Figure 5:
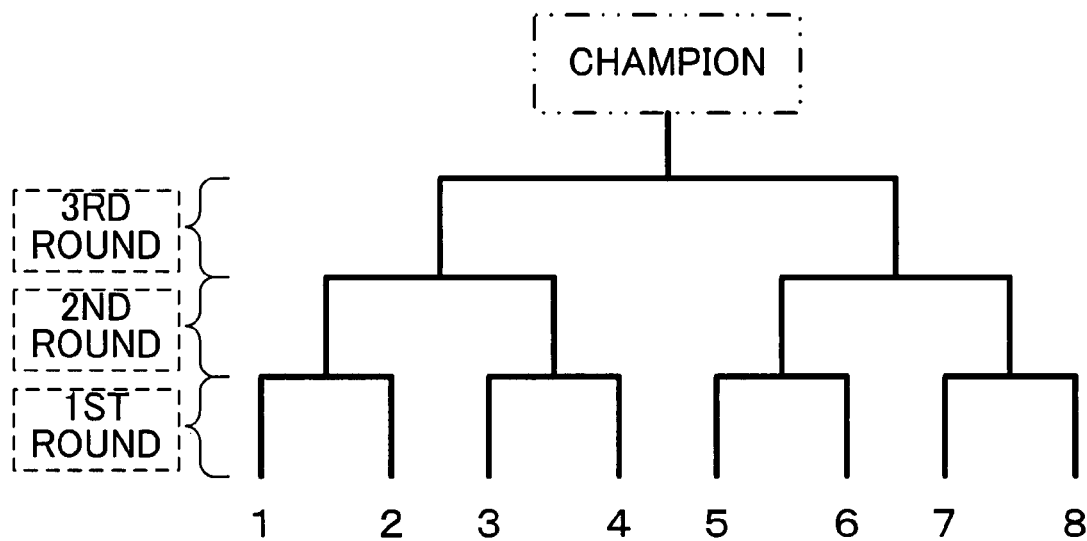
FIG. 5 is a diagram showing a usual knockout tournament.

With such a structure of the game system 100, a knockout competition can be carried out virtually in which a predetermined number of (three) players can form a team and compete against a plurality of other teams. In a normal knockout tournament, only the winners of the first round compete in the second round, and progress to the next round if they win. For example, when the champion is determined resulting from three rounds as shown in FIG. 5, the tournament cannot start until eight participants "1" through "8" get together for the first round. In contrast, the manner of knockout competition in the game system 100 allows teams in different rounds to compete against with each other. More specifically, a team that should play in the first round may compete against another team that should play in the second round. However, each game device independently manages the number of rounds of a knockout competition, and displays an image corresponding to the current round of a knockout competition. That is, a game device used by a team that should play the first round displays an image for the first round while another game device used by another team that should play the second round displays an image for the second round.

In the game system 100, since teams in different rounds may compete against with each other, a virtual tournament can start if only two teams participate in the tournament. As a result, the waiting time of the entry applicants can be shortened significantly, and the operating rate of the game devices can be enhanced. Online gaming on the Internet 1 allows remote teams to play against each other in real time. Although teams in different rounds are allowed to compete against each other, no problem will occur in online gaming since players will not care about which round their opponents are going to play.

Since entry teams are associated with the game devices, respectively, a matchup between the game devices corresponds to a matchup between teams. A game of a round consists of, e.g., a plurality of mini-games. It is possible to adopt a rule that a team which wins a predetermined number of mini-games first wins the round. For example, when a game of a round consists of three mini-games, a team who wins two mini-games first is the winner of the round.

In a mini-game, the winner is determined by a rule, e.g., a team to which a player who has made the highest score belongs is the winner. By this rule, an unskillful player can advance to the next round in a knockout competition.

Figure 6:
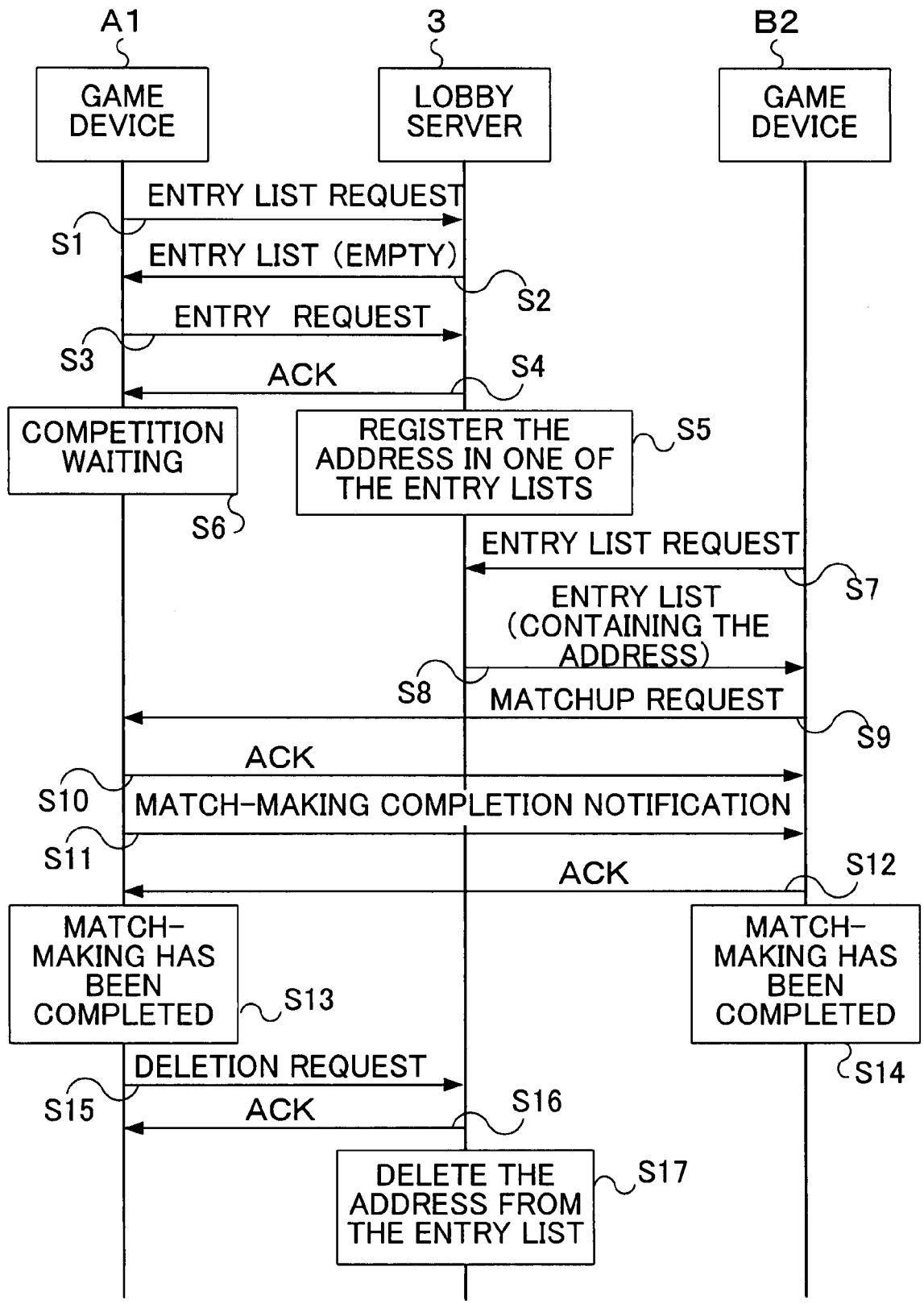
FIG. 6 is a sequence diagram showing the operation of a match-making process executed in the game system in FIG. 1.

Next, operations of the game system 100 will be described. Operations of the game system 100 are classified into a match-making process in which opponents are specified and a matchup process in which the game devices compete. FIG. 6 is a sequence diagram showing the operation of the match-making process executed in the game system 100. In the illustrated example, let us assume that the game device A1 in the game arcade A first sends the lobby server 3 a request for entry into a knockout competition, and then the game device B1 in the game arcade B sends the lobby server 3 a request for entry into the knockout competition. In addition, let us assume that in the initial condition, the lobby server 3 has not yet received any entry for any knockout competition, and therefore there is no game device that is in a competition waiting state.

In the game device A1, when a team is formed, the conditions for entry into a knockout competition are satisfied. Then, the game device A1 sends the lobby server 3 an entry list request (step S1). This entry list request demands that the lobby server 3 should return an entry list EL stored in the RAM 302. Upon receiving an entry list request, the lobby server 3 returns one of the entry lists EL (step S2). A communication address of a game device can be written in each entry list EL, but nothing is written into each entry list EL (each entry list EL is empty) when there has not been a game entry applicant team. When there is an entry list EL into which a communication address of a game device is written, the lobby server 3 sends this entry list EL in preference to the empty entry list EL. In this example, since there is no game device that is in the competition waiting state in the initial condition, an empty entry list EL is returned at step S2.

Upon receiving an entry list EL, the game device A1 determines whether or not the entry list EL contains a communication address. If the entry list EL does not contain a communication address (the entry list EL is empty), the game device A1 sends an entry request to the lobby server 3 (step S3). The entry request contains the communication address of the game device A1 itself. Upon receiving an entry request from the game device A1, the lobby server 3 returns an ACK (acknowledgment) of the entry request (step S4). In addition, upon receiving an entry request, the lobby server 3 writes the communication address of the game device A1 contained in the entry request into one of the empty entry lists EL, thereby forming an entry list EL into which the communication address of the game device (step S5). The game device A1 that received the ACK of the entry request becomes a competition waiting state (step S6). Therefore, the ACK of the entry request sent at step S4 is a wait instruction for instructing the destination device to wait for an opponent.

Thereafter, when a game device B1 sends an entry list request to the lobby server 3 (step S7), the lobby server 3 returns to the game device B1 the entry list EL into which the communication address of the game device is written (step S8). In this entry list EL, the communication address of the game device A1 is recorded. With reference to the communication address in the entry list EL, the game device B1 sends a matchup request to the game device A1 (step S9). Upon receiving a matchup request at the game device A1, the game device A1 returns an ACK of the matchup request (step S10). In addition, the game device A1 confirms that the number of the game devices has reached the number necessary for match-making (in this example, two), and sends the game device B1 a match-making completion notification indicating that match-making is completed (step S11). The game device B1 sends an ACK of the match-making completion notification to the game device A1 (step S12). Thus, the opponent game devices of the game device A1 and B1 has been determined (steps S13 and S14).

Next, the game device A1 sends a deletion request to the lobby server 3 (step S15). The deletion request demands that the lobby server 3 should delete the communication address of the game device A1 from the entry list EL. Upon receiving a deletion request, the lobby server 3 returns an ACK of the deletion request (step S16), and it deletes the communication address of the game device from the corresponding entry list EL (step S17). Thus, the communication address of a game device for which match-making has been completed can be erased from the corresponding entry list EL.

Figure 7:
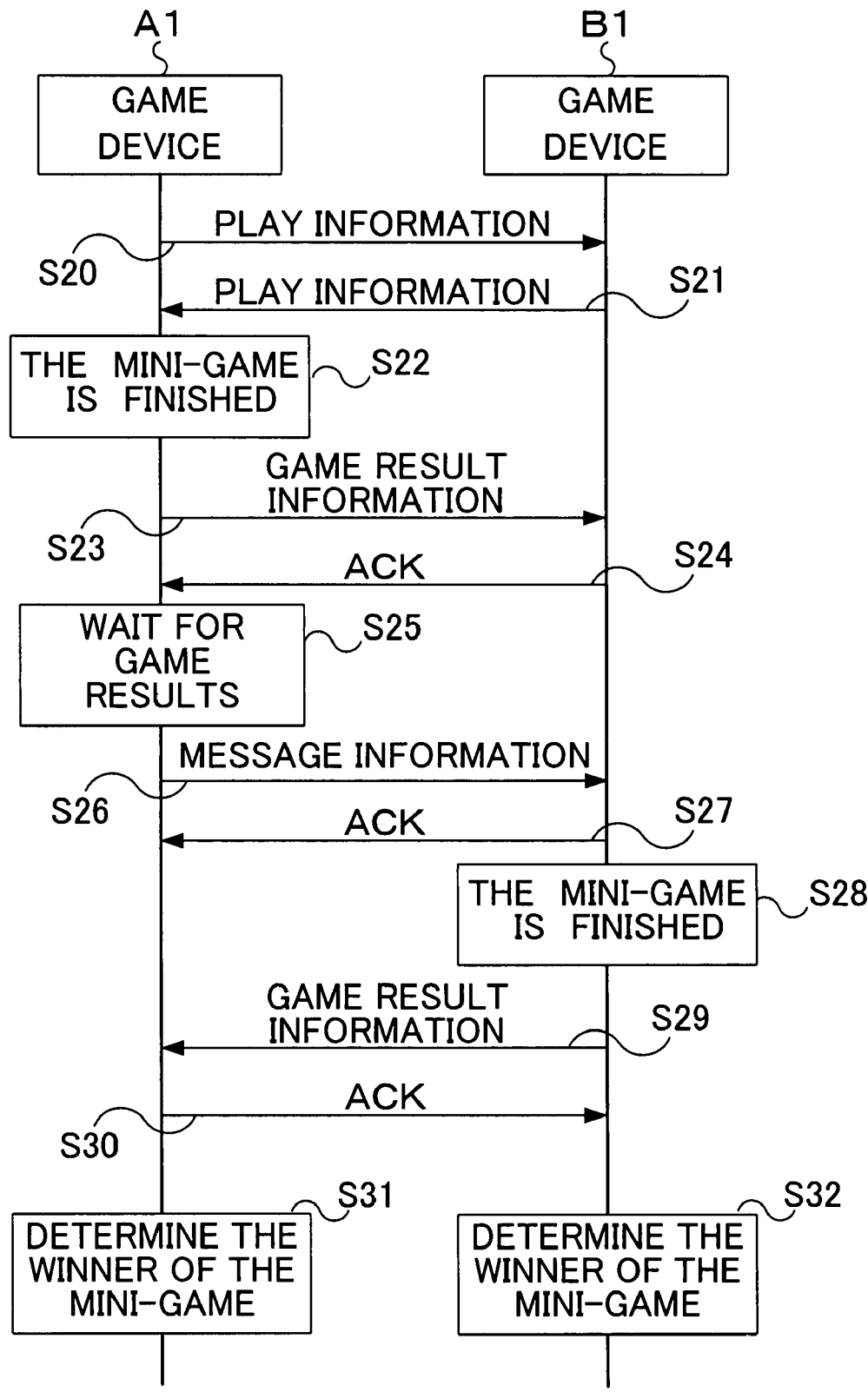
FIG. 7 is a sequence diagram showing the operation of a matchup process executed in the game system in FIG. 1.

FIG. 7 is a sequence diagram showing the operation of a matchup process executed in the game system 100. During the matchup between the game devices A1 and B2, play information is transmitted between the game devices A1 and B2 (step S20, S21). Play information is information indicating the play states of players using the transmission source game device, and for example, may contain the scores of the players. However, since frequent transmissions cause an increase in workload of the CPU 200, the frequency of transmissions is controlled in order to avoid problems in the progress of the game. For example, it is possible for the play information to be transmitted only when predetermined conditions are satisfied, for example, when a score increases dramatically by obtaining a big item or when a score exceeds a threshold. Upon receiving play information, the CPU 200 makes the display 21 show an image corresponding to the received play information. In this respect, it is preferable that an item which is being displayed be moved and/or an icon be displayed for a predetermined period, rather than displaying the score itself. In this case, players cannot know opponents' scores, but can know indirectly the fact that an opponent's score increased. As a result, the competitive spirits of players are stimulated and the interest factor of the game is increased.

The game device that has finished a mini-game first (e.g., the game device A1) sends, at steps S22 and S23, game result information to the other game device that is still executing the same mini-game (e.g., game device B1) (steps S22 and S23). Game result information is information indicating game results of a plurality of players using the transmission source game device. More specifically, game result information is score information indicating the scores of the players. Upon receiving game result information, the game device B1 returns an ACK of the game result information (step S24).

The game device A1 that transmitted game result information becomes a state for waiting game results from the game device B1 (step S25). In this state, each player of the game device A1 can send message information indicating a message, e.g., "You are slow!" or "Are you fine?" to the game device B1. Each player can select a desirable message from among message candidates shown in the display 21 by manipulating the manual operation buttons 23a through 23c, 24a through 24c, or 25a through 25c. Then, the selected message is transmitted to the game device B1 (step S26). Upon receiving message information, the game device B1 returns an ACK of the message information to the game device A1 (step S27). Accordingly, the players who finished a mini-game first do not boring periods, and opponent teams can exchange brief communications. In a modification, the message information may be contained in the play information and may be transmitted during the game.

Once the game device B1 has finished a mini-game (step S28), the game device B1 sends game result information to the game device A1 (step S29). Upon receiving game result information, the game device A1 sends an ACK of the game result information (step S30). After each of the game devices A1 and B1 obtains game result information on the opponent team, each of the game devices A1 and B1 determines the winner of the mini-game (steps S31 and S32). More specifically, the winner team is determined by whether the highest scoring player among the six players belongs to the team using the game device A1 or the team using the game device B1.

Figure 8:
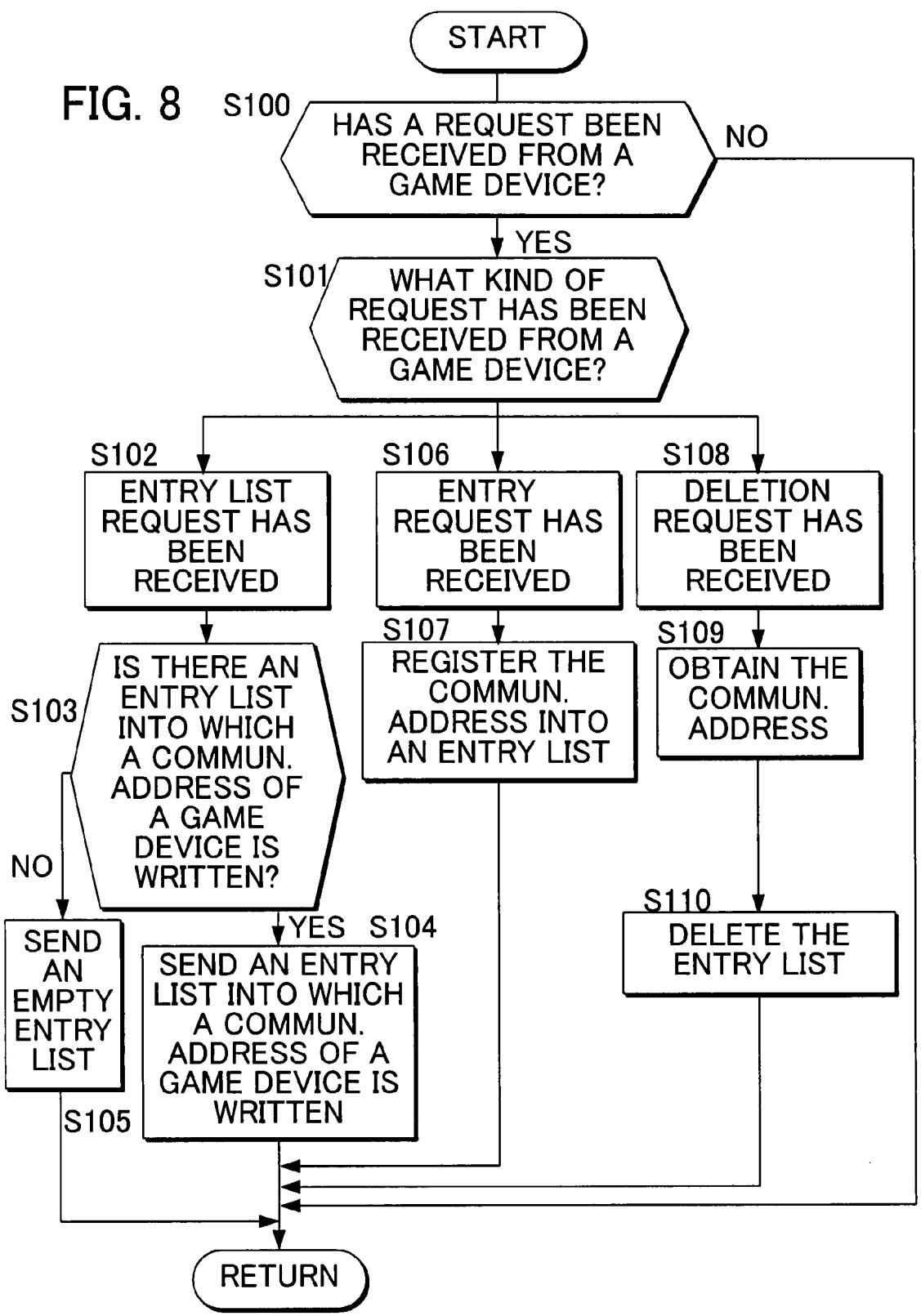
FIG. 8 is a flow chart showing the match-making process executed in the lobby server in FIG. 4.

Next, operations of the lobby server 3 will be described in detail. FIG. 8 is a flow chart showing the match-making process executed in the lobby server 3. The CPU 300 of the lobby server 3 executes the match-making process, thereby functioning as a matchmaker. More specifically, upon receiving an entry list request from a game device, the CPU 300 of the lobby server 3 returns information instructing the source game device to wait for an opponent if there has not been another game device that is in the competition waiting state. On the other hand, if there has been another game device that has sent the entry request and is in the competition waiting state, upon receiving an entry list request from a game device, the CPU 300 of the lobby server 3 returns information (entry list) indicating the opponent irrespective of the round of knockout competition in which each of the game devices is.

First, the CPU 300 determines whether or not a request has been received from a game device (step S100), and repeats this determination until a request is received from a game device. Upon receiving a request from a game device, the CPU 300 determines whether the received request has been an entry list request, an entry request, or a deletion request (step S101).

If an entry list request has been received (step S102), the CPU 300 determines whether or not there is an entry list EL in which a communication address is registered (step S103). More specifically, the CPU 300 searches the RAM 302 (storage device) and determines whether or not the RAM 302 stores an entry list EL into which a communication address of a game device is written.

If an entry list EL into which a communication address of a game device is written is stored, the CPU 300 sends it to the game device that issued the entry list request (step S104). If an entry list EL into which a communication address of a game device is written is not stored, the CPU 300 sends an empty entry list to the game device that issued the entry list request (step S105).

If the information received from a game device is an entry request (step S106), the CPU 300 registers the communication address that is contained in the entry request in an empty entry list EL (step S107).

If the information received from a game device is a deletion request (step S108), the CPU 300 obtains the communication address of the game device that sent the deletion request (step S109), and deletes the communication address from the entry list EL in which the communication address is recorded (step S110).

Figure 9:
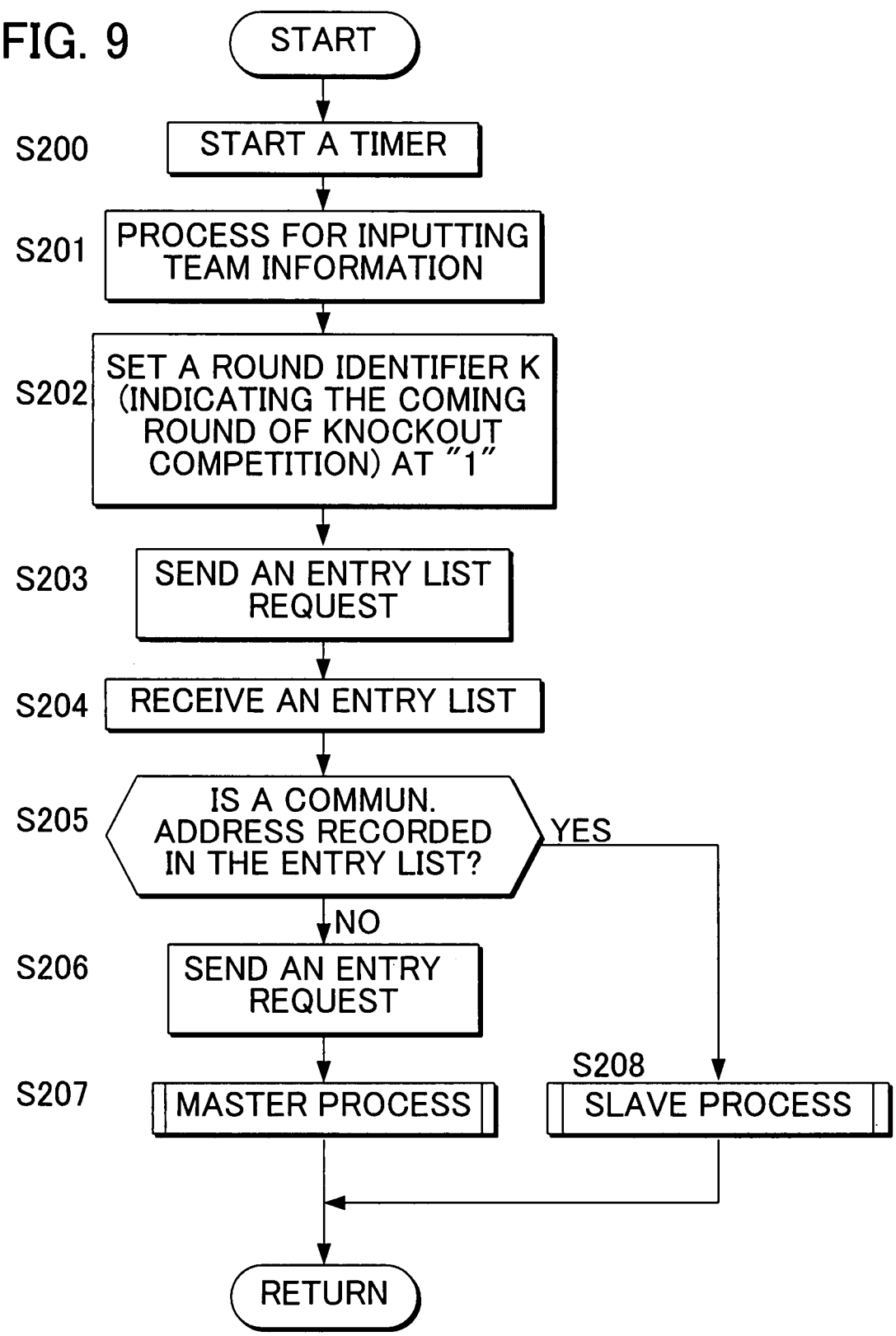
FIG. 9 is a flow chart showing operations executed in the game device in FIG. 2.

Next, operations of each game device will be described. FIG. 9 is a flow chart showing operations executed in the game device. First, the CPU 200 starts a timer for measuring time once a game can be started after a coin is inserted through the coin slot 26. This timer measures time by, e.g., counting interrupting signals supplied periodically to the CPU 200.

Next, the CPU 200 executes an inputting process for inputting team information (step S201). The team information consists of player information of three players. The individual player information of each player is constituted of a character-designation data item, a player's name data item, and an image data item. The character-designation data item indicates a character symbolizing the player on the game picture. The player's name data item indicates the player's nickname. In the inputting process, the CPU 200 causes the display 21 to show an image that facilitates selection of a character and a player's name. Once a player selects a character and the player's name by manipulating the manual operation buttons 23a through 23c, 24a through 24c, or 25a through 25c, the CPU 200 generates a character-designation data item and player's name data item. The image data item is compressed data obtained by compressing an image data item corresponding to a player inputted by the electronic camera 27. The CPU 200 causes the display 21 to show an image that facilitates inputting image data and generates the image data item once a player manipulates the manual operation buttons 23a through 23c, 24a through 24c, or 25a through 25c.

In addition to the above-mentioned player information, game arcade's name information is used as information for identifying players. The game arcade's name information indicates the name of the game arcade in which game devices are located, e.g., KONAMI @ ROPPONGI. The game arcade's name information has been inputted into and stored in a nonvolatile storage device in each game device in advance by a manager of each game arcade. The game arcade's name information, the character-designation data item, and the player's name data item facilitate distinguishing each player, but cannot uniquely identify each player since the same character and the same player's name may be selected by two or more players in one game arcade. However, image data items can be used for identifying players uniquely since each image data item is obtained by that a player takes a photograph of the player or the player's belonging, e.g., a mobile phone or a mascot. Accordingly, the player information including the image data item is convenient for identifying players when the score ranking is published on a homepage and the like. Since each image data item reflects an individual player's personality, high-score players can accentuate their presence by their image data items. In an alternative embodiment, it is possible to omit the image data item from the individual player information, and therefore, the individual player information of each player may be constituted of only a character-designation data item and a player's name data item. The team information thus generated is stored in the RAM 201.

Next, the CPU 200 sets a round identifier K, which indicates the coming round of knockout competition, at "1" which means the first round (step S202), and sends an entry list request to the lobby server 3 (step S203). Next, upon receiving an entry list EL from the lobby server 3 (step S204), the CPU 200 determines whether or not a communication address (identifier and opponent indication) is recorded in the received entry list EL. If a communication address is not recorded in the entry list EL, the CPU 200 sends an entry request containing the communication address of the game device itself to the lobby server 3 (step S206), and then executes a master process (step S207). On the other hand, if a communication address is recorded in the entry list, the CPU 200 executes a slave process (step S208).

Figure 10:
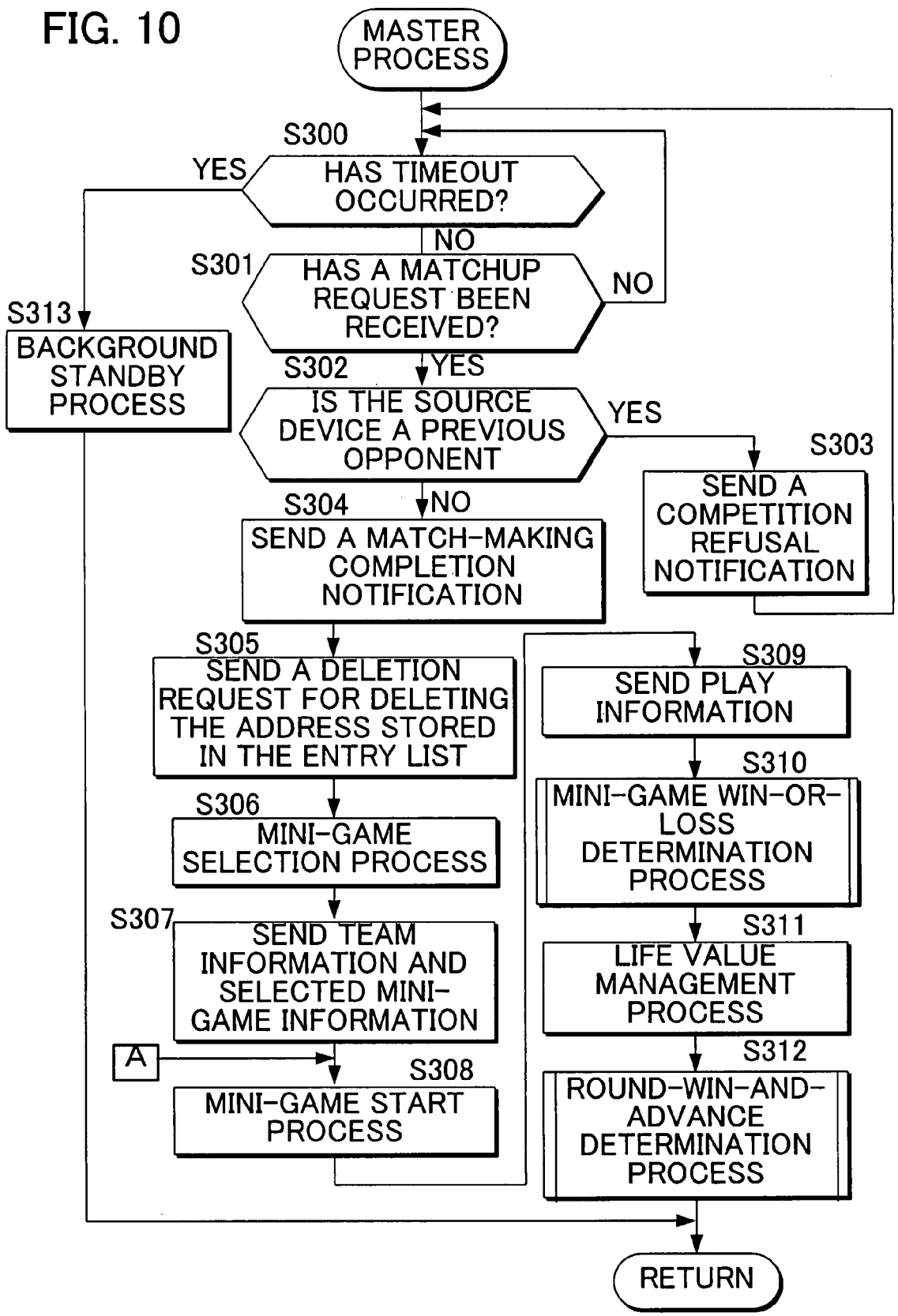
FIG. 10 is a flow chart showing a master process executed in the game device in FIG. 2.

FIG. 10 shows operations of the master process. The CPU 200 determines whether or not timeout has occurred (step S300). More specifically, if the timer count is equal to or greater than a predetermined value, the timeout period has expired. Then, CPU 200 executes a background standby process (step S313). Since this timeout means that no opponent has appeared during the predetermined period, in the background standby process, the CPU 200 serves as a pseudo opponent team and plays against the players using the game device. Thereafter, the routine returns to step S200 in FIG. 9.

On the other hand, if the time count is less than the predetermined value (timeout has not occurred), the CPU 200 advances the routine to step S301. At step S301, the CPU 200 determines whether or not a matchup request has been received from another game device. If no matchup request has been received, the CPU 200 returns the routine to step S300.

On the other hand, if a matchup request has been received, the CPU 200 determines whether or not the local game device (that has this CPU 200) has already competed against the source game device that sent the matchup request. The details of the determination are as follows: First, the CPU 200 has stored in the previous-opponent-device list in the RAM 201 one or more communication address of one or more other game devices (as identifiers for identifying other game devices) against which the local game device has already competed during a knockout competition. Second, upon receiving a matchup request, the CPU 200 compares the communication address contained in the matchup request with the communication address (if any) in the previous-opponent-device list. Third, the CPU 200 determines that the source game device is a previous opponent if the communication address contained in the matchup request coincides with any one of the communication address(es) in the previous-opponent-device list. Otherwise, the CPU 200 determines that the source game device is not a previous opponent.

In the game system 100 of the present embodiment, in order to shorten the waiting time at each game device, matchup is allowed irrespective of the round of knockout competition in which each of the game devices is, thereby facilitating match-making. Therefore, a game device may receive a matchup request from another game device against which the receiver game device previously played. In order to avoid match-making against previous opponent game devices, each game device stores the communication address (es) of one or more other game devices against which it competed previously. Alternatively, each game device may store in the RAM 302 only a communication address of the last opponent game device, so as to only avoid playing against the same game device in succession. In this modification, although the same pair of game devices may be allowed to compete against each other in the first and third rounds, match-making is easier.

If the determination at step S302 is affirmative, the CPU 200 sends a competition refusal notification to the other game device that issued the matchup request (step S303), and returns the routine to step S300. On the other hand, if the determination at step S302 is negative, the CPU 200 sends a match-making completion notification to the other game device (step S304), and sends the lobby server 3 a deletion request for deleting the address stored in the entry list (step S305). Therefore, opponents are settled unless the game devices played against each other. When match-making is completed, the CPU 200 stores the opponent's communication address contained in the matchup request in the previous-opponent-device list in the RAM 201.

Figure 11:
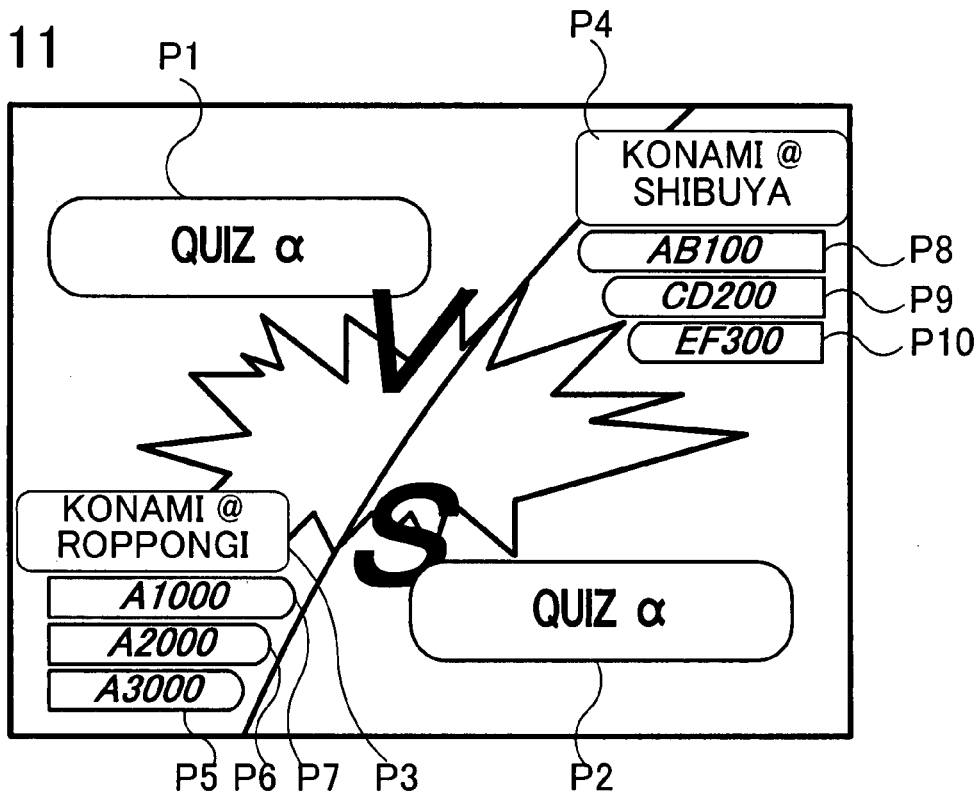
FIG. 11 is an illustration showing an example of a game image displayed on a display within the game device in FIG. 2.

Next, the CPU 200 executes a mini-game selection process (step S306). As described above, a game of a round of knockout competition consists of, e.g., a plurality of mini-games. Players of the master game device select all of the mini-games. In this process, the CPU 200 causes the display 21 to show an image that facilitates selections of mini-games (e.g., showing candidates of selectable mini-games). Once the players select three mini-games in response to the image, the CPU 200 specifies the mini-games to be executed and generates selected mini-game information indicating the selected mini-games. Then, the CPU 200 sends the team information that was generated at step S201 and the selected mini-game information to the opponent game device (step S307). Furthermore, upon receiving opponent team information from the opponent game device, the CPU 200 causes the display 21 to show an image as shown in FIG. 11. In this image, areas P1 and P2 show the name of the mini-game. While an area P3 shows the name of game arcade in which the opponent team is present, an area P4 shows the name of the game arcade in which the local game device is located. While areas P5 through P7 show player names of the opponent team, areas P8 through P10 show player names of the local team using the local game device.

Figure 12:
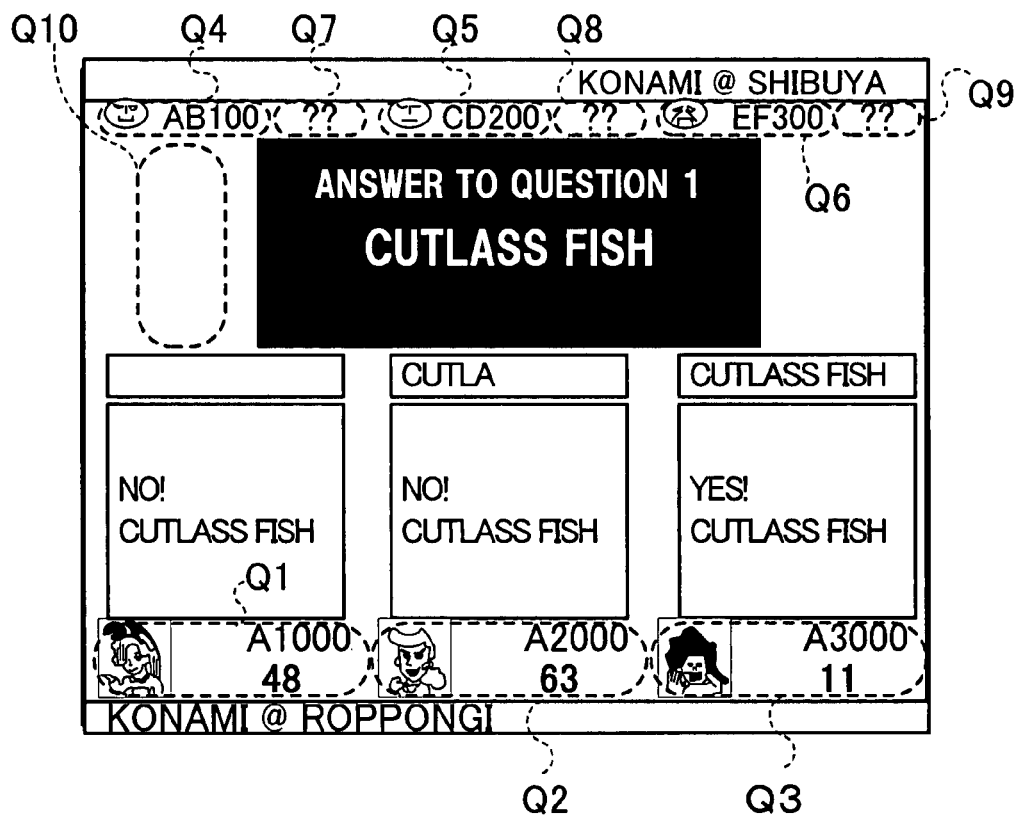
FIG. 12 is an illustration showing another example of another game image displayed on the display.

Next, the CPU 200 executes a mini-game start process to start a mini-game indicated in the selected mini-game information (step S308). While playing the game, the CPU 200 sends play information to the opponent game device (step S309). FIG. 12 shows an example of a game scene. Each of areas Q1 through Q3 shows the character and player's name, which are selected by one of the players using the local game device, and the player's score. On the other hand, each of areas Q4 through Q6 shows the character and player's name, which are selected by one of the players belonging to the opponent team. Areas Q7 through Q9 are reserved for showing scores of opponent team players. However, the opponent scores are not shown explicitly in the areas during playing game; rather, marks "??" illustrated in FIG. 12 are shimmered and/or expanded and shrunk in response to received play information. An area Q10 is reserved for showing messages sent from the opponent game device.

Figure 13:
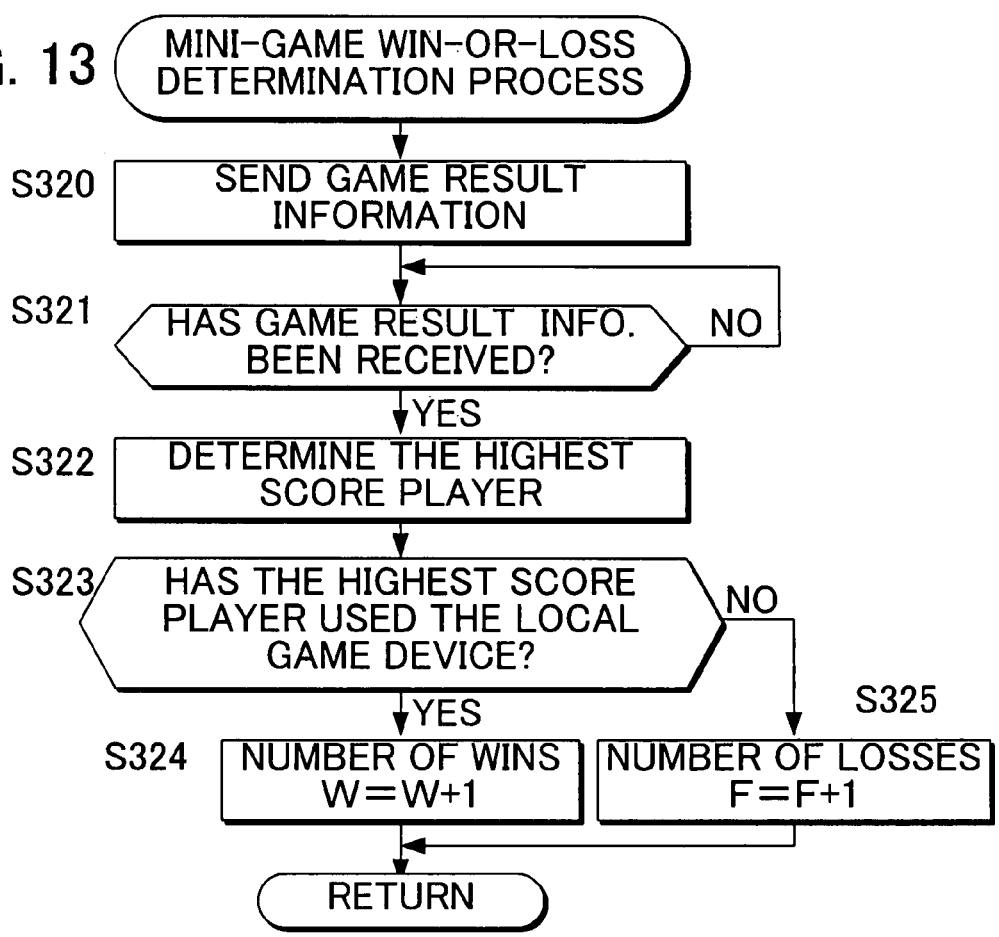
FIG. 13 is a detailed flow chart showing a mini-game win-or-loss determination process executed in the game device in FIG. 2.

Referring back to FIG. 10, after the finish of the mini-game, the CPU 200 executes a mini-game win-or-loss determination process (step S310). FIG. 13 shows a detailed flow chart of the mini-game win-or-loss determination process. First, the CPU 200 sends game result information to the opponent game device (step S320). Next, the CPU 200 determines whether or not game result information has been received from the opponent game device (step S321), and repeats this determination until the game result information is received. Upon receiving game result information, the CPU 200 determines the highest scoring player on the basis of the game result information of the local team and the game result information of the opponent team (step S322). The CPU 200 determines whether or not the highest scoring player belongs to the local team (step S323). If the highest scoring player belongs to the local team, the local team has won the mini-game, so that the CPU 200 increases the number of wins by one (step S324). On the other hand, if the highest scoring player belongs to the opponent team, the local team has lost the mini-game, so that the CPU 200 increases the number of losses by one (step S325).

If there are two highest scoring players using the local game device and the other game device, respectively, the CPU 200 may determine the winner by randomly choosing, similar to drawing lots. According to the random choice, the winner team can be determined promptly even though the highest scoring players of both teams have achieved the same score. Alternatively, the CPU 200 may repeat the mini-game until a single highest scoring player of either team is identified. In this modification, the winner team is finally defined by an actual mini-game.

Upon finishing the mini-game win-or-loss determination process, the CPU 200 advances the routine to step S311 shown in FIG. 10, and executes a life value management process. Life values are used as indicators showing whether or not a team can continue a game. The CPU 200 functions as a means for managing life values and sets each of the life values of the local players at an initial value, e.g., three. If the local team is determined to have lost a mini-game, the CPU 200 decreases each of the life values of the local player using the local game device by a predetermined value (e.g., one). The CPU 200 may further decrease the life value of the lowest scoring player by one. In this case, the CPU 200 may determine the lowest scoring player on the basis of the game result information of the local team and the game result information of the opponent team. If a life value has fallen to a predetermined value, e.g., zero, the CPU 200 disables the player corresponding to the life value from continuing the game. Therefore, each of game devices determines independently the game-device-side (local) team or a player of the game-device-side team has lost a round. However, if predetermined conditions are satisfied, for example, if the losing player pays more and selects to continue the game, the CPU 200 may set the life value back to the initial value to allow continuation of play of the game.

Figure 14:
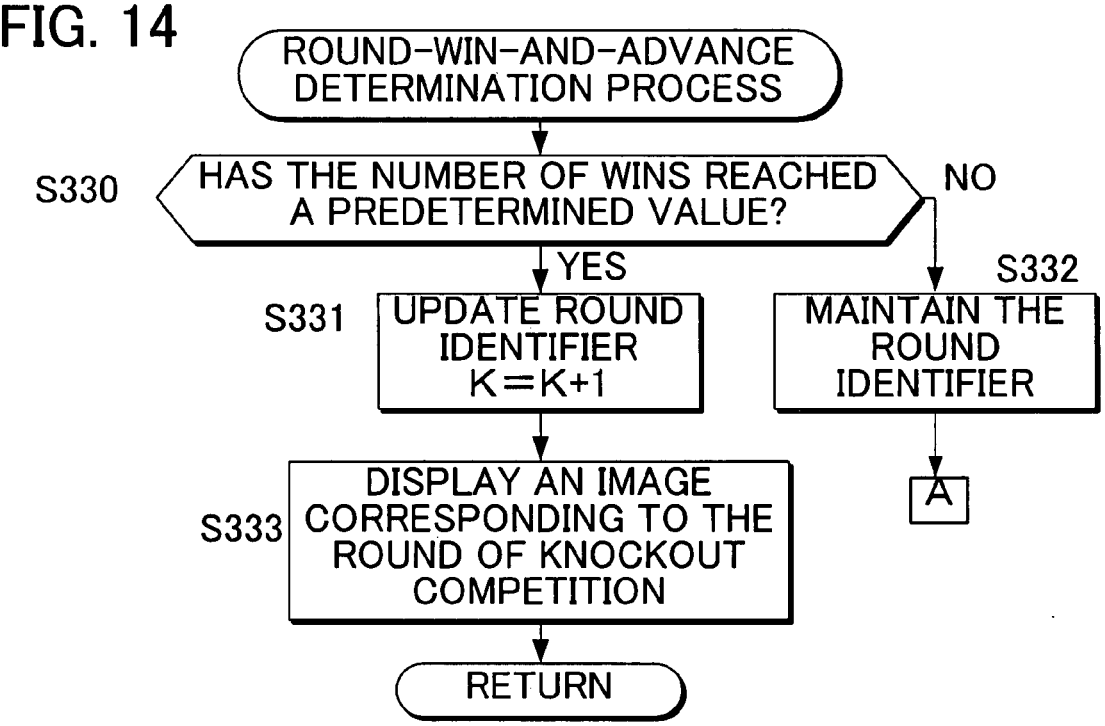
FIG. 14 is a detailed flow chart showing a win-and-advance determination process executed in the game device in FIG. 2.

Next, the CPU 200 executes a win-and-advance determination process (step S312). FIG. 14 shows a detailed flow chart showing the win-and-advance determination process. The CPU 200 determines whether or not the number of wins W has reached a predetermined value (step S330). In this example, a rule is adopted in which a team that wins two mini-games first is the winner of the round and advances to the next round since a game of a round consists of three mini-games. The predetermined value used for the determination is two. If the number of wins W has reached the predetermined value, the team has won the current round and the CPU 200 increases a round identifier K by one (step S331). The round identifier K identifies the coming round of knockout competition: the first round is indicated by K being one, the second round is indicated by K being two, the third round is indicated by K being three, and the champion is indicated by K being four. Therefore, each of the game devices determines independently whether or not its team has won a round. Next, the CPU 200 causes the display 21 to display an image corresponding to the round. For example, if K=2, displayed is an image notifying that the local team has won and passed the first round and will progress to the second round. If K=4, an image is displayed that shows the celebration of the champion and notifies of the finish of the game.

On the other hand, if the number of wins W has not reached the predetermined value, the round identifier K is maintained (step S332). For example, if the first mini-game of the second round has been lost, the next mini-game will be the second mini-game of the second round. Then, the CPU 200 advances the routine to step S308 in FIG. 10, and executes the mini-game start process to start the next mini-game indicated in the selected mini-game information when the local game device is the master. In an alternative embodiment, if the number of wins W is not increased for losing the competition, the CPU 200 may reset the round identifier K to one at step S332 for restarting with the first round, instead of maintaining the round identifier K. Next, the CPU 200 causes the display 21 to show an image corresponding to the round of knockout competition (step S334).

Figure 15:
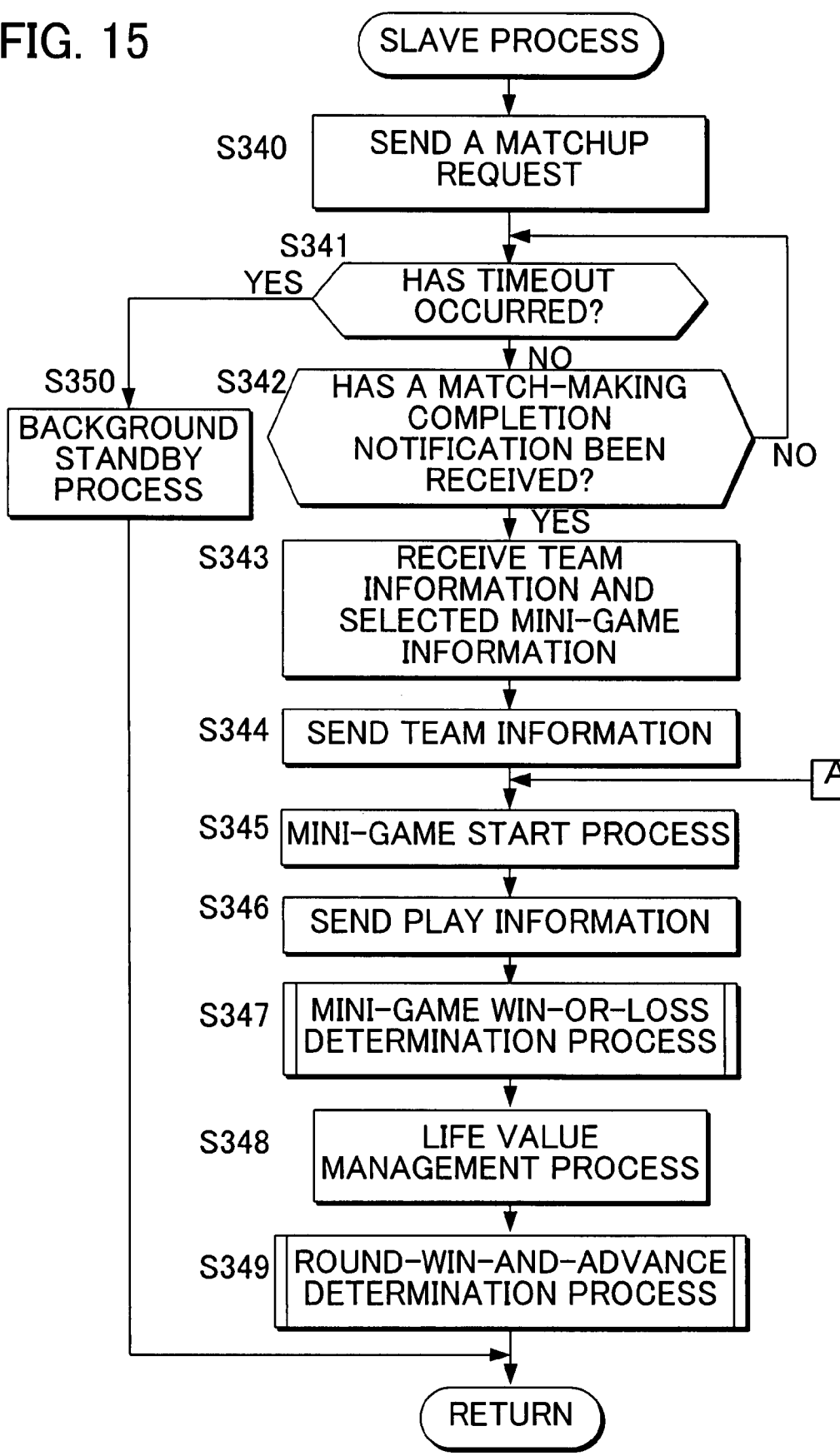
FIG. 15 is a detailed flow chart showing a slave process executed in the game device in FIG. 2.

Next, the slave process will be described. FIG. 15 shows operations of the slave process. First, the CPU 200 refers to a communication address registered in the entry list obtained at step S204, and sends the master game device a matchup request (step S340). Next, the CPU 200 determines whether or not timeout has occurred (step S341). More specifically, if the timer count is equal to or greater than a predetermined value, the timeout period has expired. Then, CPU 200 executes the background standby process (step S350). Since this timeout means that no opponent has appeared during the predetermined period, in the background standby process, the CPU 200 serves as a pseudo opponent team and plays against the players using the game device. Thereafter, the routine returns to step S200 in FIG. 9. On the other hand, if the time count is less than the predetermined value (timeout has not occurred), the CPU 200 advances the routine to step S342. At step S342, the CPU 200 determines whether or not a match-making completion notification has been received. If no match-making completion notification has been received, the CPU 200 returns the routine to step S342. On the other hand, if a match-making completion notification is received, the CPU 200 advances the routine to step S343. The routine from step S343 to step S349 is the same as the aforementioned routine from step S307 to step S312, and therefore description of it will be omitted. However, after maintaining the round identifier (step S332 in FIG. 14) of in the win-and-advance determination process (step S349), the CPU 200 as the slave advances the routine to step S345 in FIG. 15, and executes the mini-game start process to start the next mini-game indicated in the selected mini-game information.

The present invention has been described with reference to embodiments. However, it is not intended to limit the present invention to those set forth in embodiments disclosed herein, and it can be modified as appropriate within a range not departing from the essential features of the present invention. Examples of modifications are as follows:

(1) It is preferable that the above-described CPU 200 execute:
  a process for determining the lowest scoring player by referring to the game result information of the local game device and an opponent game device and comparing the scores of players with one another (serving as a second determiner);
  a process for setting, at the start of gaming, life values of individual players that are indicators showing whether or not a game can be continued (serving as a setter);
  a process for decreasing the life values of the players of the local team using the local game device by a predetermined value (e.g., one) if it is determined that the local team has lost in the mini-game win-or-loss determination process;
  a process for decreasing the life values of the lowest scoring player by a predetermined value (e.g., one) if the lowest scoring player belongs to the local team using the local game device (serving as an decreaser);
  a process for disabling a player of which the life value has fallen to a predetermined value from continuing the game unless a predetermined condition is satisfied.

In this modified embodiment, the CPU 200 manages the life value of the lowest scoring player in addition to decreasing the life values for the losing team in a mini-game. If the life value of only one player has fallen to the predetermined value, not all of the team members are disabled from continuing a game, i.e., only the player is disabled. In a team matchup, ejection of a member of either team will bring disadvantages for the team. Accordingly, the interest factor in the competition between two teams is increased by managing two factors, such as decrease in the life values of a whole team and decrease in the life values of individuals.

(2) If the life value of one or more players in a team at a game device has indicated enablement of continuing a game and the remaining life value of one or more other players at the same game device indicates disablement of continuing, the CPU 200 (manager) may allows the computer to continue the game instead of the disabled player. Although the disabled member of either team has been ejected, the matchup continues without lack of members of both teams since the computer player continues the game in place of the ejected member.

In this modified embodiment, at the determination of the highest scoring player of step S322, it is preferable that the CPU 200 determine the highest scoring player among the players except for the computer player, whereby the winner team can be determined by results of the human players.

In this modified embodiment, at the determination of the lowest scoring player, it is preferable that the CPU 200 determine the lowest scoring player among the players except for the computer player. Accordingly, although the computer makes the lowest score, the life value of the lowest scoring player among human payers is decreased.

(3) In the above-described embodiment, the game device serving as the master determines whether the other entry applicant is a previous opponent or not (step 302 in FIG. 10). It is, however, not intended to limit the present invention to the embodiment; rather the other game device serving as the slave that executes the slave process may determine whether or not the other entry applicant is a previous opponent. In this modified embodiment, steps S302 and S303 is omitted in the master process shown in FIG. 10, and if the determination at step S301 is affirmative, the routine is advanced to step S304. In addition, directly before step 340 in the slave process shown in FIG. 15, there is provided a determination process for determining whether or not the other entry applicant is a previous opponent. In this determination process, the CPU 200 determines whether or not a communication address recorded in the entry list EL received from the lobby server 3 is contained in the previous-opponent-device list stored in the RAM 201. If the communication address is contained in the previous-opponent-device list, it is determined that the game device corresponding to the communication address is a previous opponent, and the CPU 200 returns the routine to step S203 in FIG. 9. Otherwise, it is not a previous opponent and the CPU 200 advances the routine to step S340 in FIG. 15 to send a matchup request. Alternatively, if it is determined that the game device corresponding to the communication address is a previous opponent, the CPU 200 may advance the routine to step 206 in FIG. 9 to send an entry request to the lobby server 3.

Figure 16:
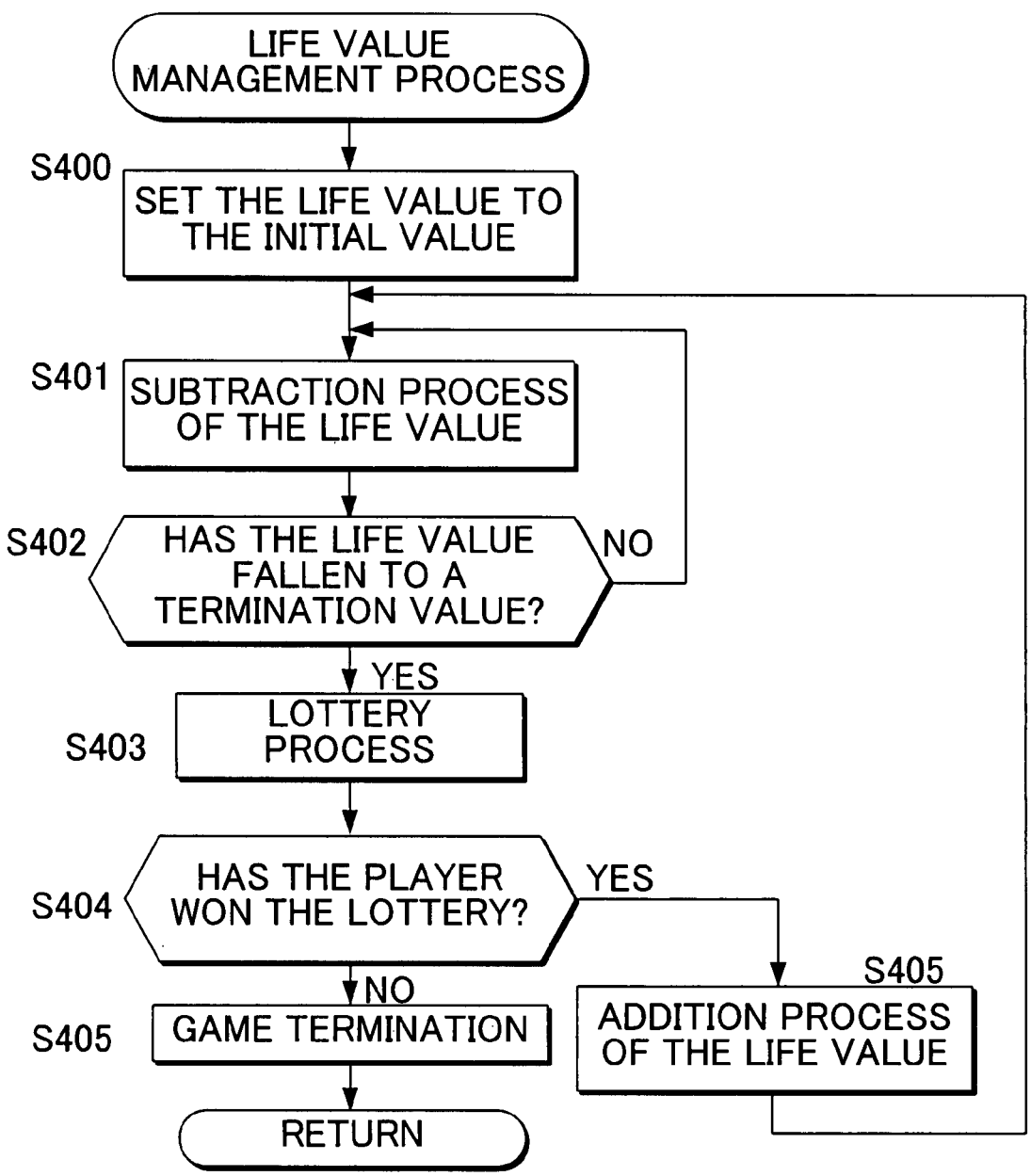
FIG. 16 is a flow chart showing a variation of a life value management process executed in the game device in FIG. 2.

(4) In the above-described embodiment, the CPU 200 of a game device sets the life value of each player to the initial value at the start of gaming, and manages the life values according to progress of the game. If a life value has fallen to a predetermined value, the CPU 200 disables the player corresponding to the life value from continuing the game. It is, however, not intended to limit the present invention to the embodiment; rather the CPU 200 may execute another type of life value management process shown in FIG. 16 with respect to each player.

First, the CPU 200 sets the life value to the initial value at the start of gaming (step S400). Next, the CPU 200 executes a subtraction process for the life value according to progress of the game (step S401). For example, the CPU 200 decreases each of the life values of the players of the local team if the local team has lost a mini-game, and/or decreases the life value of the lowest scoring player. Then, the CPU 200 determines whether or not the life value has fallen to a termination value (step S402). The termination value is a criterion for determining the termination of a game.

If the life value has not fallen to the termination value, the determination at step 402 is negative and the CPU 200 returns the routine to step S401. On the other hand, if the life value has fallen to the termination value, the determination at step 402 is affirmative and the CPU 200 advances the routine to step S403 to execute a lottery process. Then, the CPU 200 determines whether or not the player has won the lottery (step S404). If the player has won the lottery, the CPU 200 executes an addition process wherein the life value is increased by a predetermined value (step S405), and returns the routine to step S401. On the other hand, if the player has not won the lottery, the CPU 200 disables the player from continuing the game, so as to terminate the game (step S405).

According to the above-described routine, although a life value has fallen to the termination value, the life value can be increased if the player has won the lottery, so that the game can be continued. Therefore, this routine can raise the player's hopes that the player may continue the game even though the life value is decreased by the loss of mini-games. The probability of winning the lottery may be varied depending on scores of players, e.g., the lower the score, the higher the probability of winning, so that unskillful players receive more aid.

(5) In the mini-game win-or-loss determination process of the above-described embodiment, the winner is determined by whether the highest scoring player belongs to the local team or the opponent team. It is, however, not intended to limit the present invention to the embodiment; rather it is possible to utilize other determination rules in which the winner is determined on the basis of the score information of the local team and the opponent team.

Figure 17:
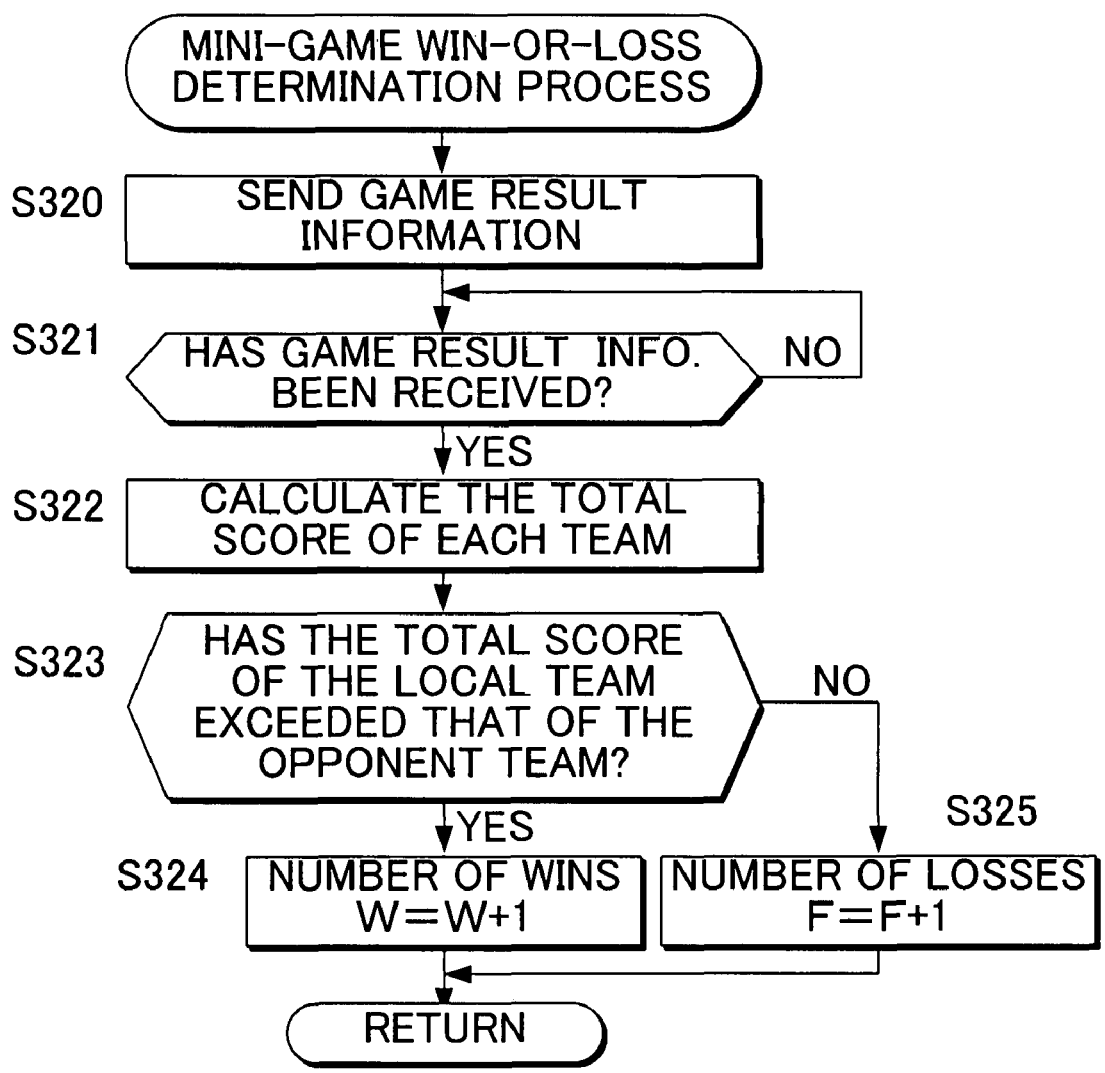
FIG. 17 is a flow chart showing a variation of a mini-game win-or-loss determination process executed in the game device in FIG. 2.

For example, the total score of each team is calculated, and then the winner is determined on the basis of the comparison of the total scores of both teams. FIG. 17 is a flow chart showing a variation of the mini-game win-or-loss determination process. This modified mini-game win-or-loss determination process is similar to the above-described mini-game win-or-loss determination process shown in FIG. 13, except that step S322 is replaced by step S322*a* and step S323 is replaced by step S323*a*. At step S322*a*, the CPU 200 calculates the total score of the local team using the local game device on the basis of the game result information prepared by the CPU 200 itself, and calculates the total score of the opponent team using the opponent game device on the basis of the received game result information. Then, the CPU 200 determines whether or not the total score of the local team has exceeded the total score of the opponent team. If the total score of the local team is greater than that of the opponent team, the CPU 200 determines that the local team has won the mini-game, and advances the routine to step S324. Otherwise, in the contrary case, the CPU 200 determines that the local team has lost the mini-game, and advances the routine to step S325.

In this modified embodiment, if the computer player continues the game in place of an ejected member who is disabled from playing the game due to decrease in the life value, the score of the computer player may not be included in the total score. Accordingly, knockout competition between human players can be enjoyed.

The invention claimed is:

1. A game system comprising a server device and a plurality of game devices and capable of executing a virtual knockout competition including a plurality of rounds, the server device comprising:
 a matchmaker for returning a competition wait-instruction to a new entry game device upon receiving from the new entry game device an entry request requesting a matchup when there is no preceding entry game device in a competition waiting state, and for returning an opponent indication to the new entry game device upon receiving from the new entry game device an entry request when there is a preceding entry game device in the competition waiting state since the server device has already received another entry request from the preceding entry game device, the opponent indication indicating an opponent of the new entry game device irrespective of the round of the knockout competition in which each of the new entry game device and the preceding entry game device is,
each of the game devices comprising:
a display for displaying images;
an establisher for establishing as an opponent another game device indicated in the opponent indication and for sending a matchup request to the other game device if information returned from the server device is the opponent indication, the establisher waiting for a matchup request from another game device and establishing as an opponent another game device having sent a matchup request upon receiving the matchup request if information returned from the server device is the competition wait-instruction;
a result generator for generating first game result information indicating a game result at the game device, and for sending the first game result information to the opponent;
a win-or-loss determiner for determining, upon receiving a second game result information indicating the opponent from the opponent, whether the game device or the opponent has won on the basis of comparing the first game result information with the second game result information;
a game progress manager for managing the round of the knockout competition in which the game device is, for progressing the game device to the next round on the basis of the determination by the win-or-loss determiner, and for causing the display to show an image corresponding to the round; and
an entry requester for sending an entry request to the server device when participating in each round of the knockout competition,
wherein the new entry game device is in one round and the preceding entry game device is in another round that is different from said one round, and
wherein each of the game devices independently manages a number of rounds of the knockout competition.

2. The game system according to claim 1, wherein the matchmaker of the server device comprises:
a storage device for storing entry information indicating whether or not a preceding entry game device is in the competition waiting state;
a replier for returning to a new entry game device the opponent indication that is entry information in which is recorded an identifier of a preceding entry game device in the competition waiting state, and for returning to a new entry game device the competition wait-instruction that is entry information in which an identifier of a preceding entry game device in the competition waiting state is not recorded;
a recorder for recording, upon receiving an identifier for identifying one of the game devices from the game device, the identifier in the entry information; and
a deleter for deleting, upon receiving a deletion request from a game device of which an opponent has been established, the identifier of the game device that sent the deletion request from the entry information,
and wherein the establisher of each of the game devices comprises:
a first establisher for referring to an identifier of another game device contained in entry information returned from the server device if the identifier is recorded in the entry information, for sending a matchup request to the other game device identified by the identifier, and for establishing as an opponent the other game device identified by the identifier;
a second establisher for waiting for a matchup request from another game device if no identifier is recorded in the entry information returned from the server device, and for establishing as an opponent another game device that sent a matchup request, upon receiving the matchup request; and
a deletion requester for sending a deletion request to the server device when the first establisher establishes the opponent.

3. The game system according to claim 1, wherein:
new entry game devices are added to the virtual knockout competition after a first round of the virtual knockout competition.

4. The game system according to claim 1, wherein:
the game progress manager of the game device manages a round identifier that identifies the number of the round of the knockout competition in which the game device is, and
the game progress manager causes the display to show an image showing that a player at the game device is the champion of the knockout competition when the number identified by the round identifier reaches a predetermined number.

5. A game device used in a game system capable of executing a virtual knockout competition including a plurality of rounds, the game system comprising a server device for returning a competition wait-instruction to a new entry game device upon receiving from the new entry game device an entry request requesting a matchup when there is no preceding entry game device in a competition waiting state, and for returning an opponent indication to the new entry game device upon receiving from the new entry game device an entry request when there is a preceding entry game device in the competition waiting state since the server device has already received another entry request from the preceding entry game device, the opponent indication indicating an opponent of the new entry game device irrespective of the round of the knockout competition in which each of the new entry game device and the preceding entry game device is,
the game device comprising:
a display for displaying images;
an establisher for establishing as an opponent another game device indicated in the opponent indication and for sending a matchup request to the other game device if information returned from the server device is the opponent indication, the establisher waiting for a matchup request from another game device and establishing as an opponent another game device having sent a matchup request upon receiving the matchup request if information returned from the server device is the competition wait-instruction;
a result generator for generating first game result information indicating a game result at the game device, and for sending the first game result information to the opponent;
a win-or-loss determiner for determining, upon receiving a second game result information indicating the opponent from the opponent, whether the game device or the opponent has won on the basis of comparing the first game result information with the second game result information;
a game progress manager for managing the round of the knockout competition in which the game device is, for progressing the game device to the next round on the basis of the determination by the win-or-loss determiner, and for causing the display to show an image corresponding to the round; and an entry requester for sending an entry request to the server device when participating in each round of the knockout competition, wherein the new entry game device is in one round and the preceding entry game device is in another round that is different from said one round, and wherein each of the game devices independently manages a number of rounds of the knockout competition.

6. The game device according to claim 5, wherein the server device manages entry information indicating whether or not a preceding entry game device is in the competition waiting state, the opponent indication is entry information in which is recorded an identifier of a preceding entry game device in the competition waiting state, and the competition wait-instruction is entry information in which an identifier of a preceding entry game device in the competition waiting state is not recorded;

and wherein the establisher includes:

a first establisher for referring to an identifier of another game device contained in entry information returned from the server device if the identifier is recorded in the entry information, for sending a matchup request to the other game device identified by the identifier, and for establishing as an opponent the other game device identified by the identifier;

a second establisher for waiting for a matchup request from another game device if no identifier is recorded in the entry information returned from the server device, and for establishing as an opponent another game device that sent a matchup request, upon receiving the matchup request; and a deletion requester for sending a deletion request to the server device when the first establisher establishes the opponent.

7. The game device according to claim 6, wherein the establisher includes a storage device for storing an identifier of another game device against which the game device competed in a round of the knockout competition, wherein the first establisher includes:

an identifier transmitter for transmitting a matchup request to another game device, the matchup request containing an identifier of the game device itself; and a matchup response receiver for receiving a matchup response indicating acceptance of matchup from the other game device that is a destination of the matchup request, and for establishing the other game device that sent the matchup response as an opponent upon receiving the matchup response, and wherein the second establisher includes:

an identifier comparer for comparing an identifier contained in a matchup request received from another game device with the identifier stored in the storage device; and a matchup response transmitter for transmitting a matchup response indicating acceptance of matchup to the other game device that sent the matchup request if the comparison by the identifier comparer is negative.

8. The game device according to claim 7, wherein the second establisher transmits a matchup response indicating refusal of matchup to the other game device that sent the matchup request if the comparison by the identifier comparer is affirmative, and wherein the entry requester sends an entry request to the server device again upon receiving a matchup response indicating refusal of matchup from another game device.

9. The game device according to claim 6, wherein the establisher includes a storage device for storing an identifier of another game device against which the game device competed in a round of the knockout competition, wherein the first establisher includes:

an identifier comparer for comparing, if an identifier is recorded in entry information returned from the server device, the identifier in the entry information with the identifier stored in the storage device;

a matchup request transmitter for generating a matchup request containing the identifier of the game device itself if the comparison by the identifier comparer is negative, and for transmitting the matchup request to the other game device identified by the identifier recorded in the entry information; and a matchup response receiver for receiving a matchup response indicating acceptance of matchup from the other game device that is a destination of the matchup request, and for establishing the other game device that sent the matchup response as an opponent upon receiving the matchup response, and wherein the second establisher includes a matchup response transmitter for transmitting, upon receiving a matchup request from another game device, a matchup response indicating acceptance of matchup to the other game device that sent the matchup request, and for establishing the other game device that sent the matchup request as an opponent.

10. The game device according to claim 9, wherein if the identifier comparer of the first establisher determines that the identifier in entry information coincides with the identifier stored in the storage device, the entry requester sends the entry request to the server device again.

11. The game device according to any one of claims 5 through 9, wherein the game progress manager includes a counter for counting the number of determinations that the win-or-loss determiner determines the game device has won, and a detector for detecting the number counted by the counter has reached a predetermined value prior to the opponent, and wherein the game progress manager determines that the game device has won a current round of the knockout competition if the detector detects that the number counted by the counter has reached the predetermined value prior to the opponent.

12. The game device according to any one of claims 5 through 10, further comprising:

a setter, at the start of a game, for setting a life value that is an indicator showing whether or not a game can be continued;

a life value manager for decreasing the life value by a predetermined value if the win-or-loss determiner determines that the game device has lost;

a lottery executor for executing a lottery if the life value has fallen to a predetermined value; and a terminator for terminating the game if the game device has lost the lottery, and for increasing the life value by a predetermined value if the game device has won the lottery.

13. The game device according to claim 10, further comprising:

a setter, at the start of a game, for setting a life value that is an indicator showing whether or not a game can be continued;

a life value manager for decreasing the life value by a predetermined value if the win-or-loss determiner determines that the game device has lost;

a lottery executor for executing a lottery if the life value has fallen to a predetermined value; and a terminator for terminating the game if the game device has lost the lottery, and for increasing the life value by a predetermined value if the game device has won the lottery, wherein the game progress manager includes a counter for counting the number of determinations that the win-or-loss determiner determines the game device has won, and a detector for detecting the number counted by the counter has reached a predetermined value prior to the opponent, and wherein the game progress manager determines that the game device has won a current round of the knockout competition if the detector detects that the number counted by the counter has reached the predetermined value prior to the opponent.

14. The game device according to claim 5, wherein:

the game progress manager manages a round identifier that identifies the number of the round of the knockout competition in which the game device is, and the game progress manager causes the display to show an image showing that a player at the game device is the champion of the knockout competition when the number identified by the round identifier reaches a predetermined number.

* * * * *